United States Patent
Shima et al.

(10) Patent No.: US 9,508,293 B2
(45) Date of Patent: Nov. 29, 2016

(54) LIQUID CRYSTAL DISPLAY DEVICE

(71) Applicant: TOPPAN PRINTING CO., LTD., Tokyo (JP)

(72) Inventors: Yasuhiro Shima, Tokyo (JP); Hisashi Nakada, Tokyo (JP); Kenzo Fukuyoshi, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 29 days.

(21) Appl. No.: 14/517,005

(22) Filed: Oct. 17, 2014

(65) Prior Publication Data

US 2015/0035873 A1 Feb. 5, 2015

Related U.S. Application Data

(63) Continuation of application No. PCT/JP2013/057884, filed on Mar. 19, 2013.

(30) Foreign Application Priority Data

Apr. 18, 2012 (JP) .................................. 2012-094959

(51) Int. Cl.
*G09G 3/34* (2006.01)
*G02B 27/22* (2006.01)
(Continued)

(52) U.S. Cl.
CPC ............. *G09G 3/3413* (2013.01); *G02B 5/201* (2013.01); *G02B 27/2214* (2013.01);
(Continued)

(58) Field of Classification Search
CPC G02B 27/2214; G02B 5/201; G02B 6/0053; G02F 1/133512; G02F 1/133514; G02F 1/133615; G02F 1/133707; G02F 1/134336; G02F 1/1393; G02F 2001/134318; G02F 2001/13712
See application file for complete search history.

(56) References Cited

U.S. PATENT DOCUMENTS

| 5,602,658 A | 2/1997 | Ezra et al. |
| 2005/0073625 A1 | 4/2005 | Daiku et al. |

(Continued)

FOREIGN PATENT DOCUMENTS

| EP | 2 426 401 A1 | 3/2012 |
| JP | 2006-164842 | 6/2006 |

(Continued)

OTHER PUBLICATIONS

International Search Report mailed Jun. 18, 2013, in corresponding International Patent Application No. PCT/JP2013/057884.
(Continued)

*Primary Examiner* — Viet Pham

(57) ABSTRACT

A device according to an embodiment includes an array substrate, a color filter substrate including color filters corresponding to pixels, a liquid crystal layer provided between the substrates, a backlight unit, and a controller. The controller controls an application timing of a driving voltage to the pixel electrodes, and a light emission timing of the backlight unit. Each of the pixels has a shape elongated in a lateral direction. Identical colors of the pixels are arranged in the lateral direction, and different colors of the pixels are arranged in a vertical direction. Pixels neighboring in the lateral direction have shapes of line-symmetry with respect to a center line of the neighboring pixels, and liquid crystal molecules of them tilt in directions of the line-symmetry with respect to the center line when the driving voltage is applied to the pixel electrodes corresponding to the neighboring pixels.

12 Claims, 15 Drawing Sheets

(51) Int. Cl.
*G09G 3/00* (2006.01)
*H04N 13/04* (2006.01)
*G02F 1/1335* (2006.01)
*G02F 1/133* (2006.01)
*G02F 1/1343* (2006.01)
*G02F 1/1368* (2006.01)
*G02F 1/137* (2006.01)
*G09G 3/36* (2006.01)
*G02B 5/20* (2006.01)
*G02F 1/1337* (2006.01)
*G02F 1/139* (2006.01)
*G02F 1/29* (2006.01)
*F21V 8/00* (2006.01)

(52) U.S. Cl.
CPC ............ G02F 1/137 (2013.01); G02F 1/1368 (2013.01); G02F 1/1393 (2013.01); G02F 1/13306 (2013.01); G02F 1/13439 (2013.01); G02F 1/133512 (2013.01); G02F 1/133514 (2013.01); G02F 1/133615 (2013.01); G02F 1/133707 (2013.01); G02F 1/134336 (2013.01); G02F 1/292 (2013.01); G09G 3/006 (2013.01); G09G 3/3607 (2013.01); H04N 13/0404 (2013.01); H04N 13/0406 (2013.01); H04N 13/0422 (2013.01); H04N 13/0434 (2013.01); H04N 13/0454 (2013.01); H04N 13/0477 (2013.01); *G02B 6/0053* (2013.01); *G02F 2001/13712* (2013.01); *G02F 2001/133738* (2013.01); *G02F 2001/134318* (2013.01); *G02F 2001/134345* (2013.01)

(56) References Cited

U.S. PATENT DOCUMENTS

| | | | |
|---|---|---|---|
| 2005/0099578 A1 | 5/2005 | Kim et al. | |
| 2006/0125774 A1* | 6/2006 | Nishigaki | G09G 3/342 345/102 |
| 2009/0015768 A1 | 1/2009 | Igeta et al. | |
| 2009/0316058 A1* | 12/2009 | Huizinga | G02B 6/0053 349/15 |
| 2011/0304612 A1* | 12/2011 | Ohyama | G02F 1/1347 345/419 |
| 2011/0304797 A1* | 12/2011 | Murata | G02F 1/134363 349/62 |
| 2013/0002974 A1 | 1/2013 | Minato et al. | |

FOREIGN PATENT DOCUMENTS

| | | |
|---|---|---|
| JP | 2006-309103 | 11/2006 |
| JP | 3930021 | 6/2007 |
| JP | 4010564 | 11/2007 |
| JP | 2008-249887 | 10/2008 |
| JP | 2009-3002 | 1/2009 |
| JP | 4213226 | 1/2009 |
| JP | 2010-506214 | 2/2010 |
| JP | 2010-524047 | 7/2010 |
| JP | 2010-541019 | 12/2010 |
| JP | 2010-541020 | 12/2010 |
| JP | 4655465 | 3/2011 |
| JP | 2011-197149 | 10/2011 |
| JP | 2012-32533 | 2/2012 |
| KR | 10-2005-0033470 | 4/2005 |
| KR | 10-2005-0044952 | 5/2005 |
| KR | 10-2009-0006754 | 1/2009 |
| KR | 10-2011-0017918 | 2/2011 |
| KR | 10-2011-0135340 | 12/2011 |
| TW | 575194 | 2/2004 |
| TW | 200910310 | 3/2009 |
| TW | 201207494 A1 | 2/2012 |
| WO | WO 97/02709 | 1/1997 |
| WO | WO 2008/124709 A1 | 10/2008 |
| WO | WO 2011/138847 A1 | 11/2011 |
| WO | WO 2011/148706 A1 | 12/2011 |

OTHER PUBLICATIONS

Taiwanese Office Action mailed Aug. 11, 2014, in corresponding Taiwanese Application No. 102113556.
PCT International Preliminary Report on Patentability mailed Dec. 11, 2014 in corresponding International Patent Application No. PCT/JP2013/057884.
Extended European Search Report dated Mar. 17, 2015 in corresponding European Patent Application No. 13778243.9.
Korean Office Action dated Nov. 20, 2015 in corresponding Korean Patent Application No. 10-2014-7029185.
European Search Report dated Feb. 2, 2016 in corresponding European Patent Application No. 13778243.9.
Chinese Office Action dated May 30, 2016 in corresponding Chinese Patent Application No. 201380020568.3.

* cited by examiner

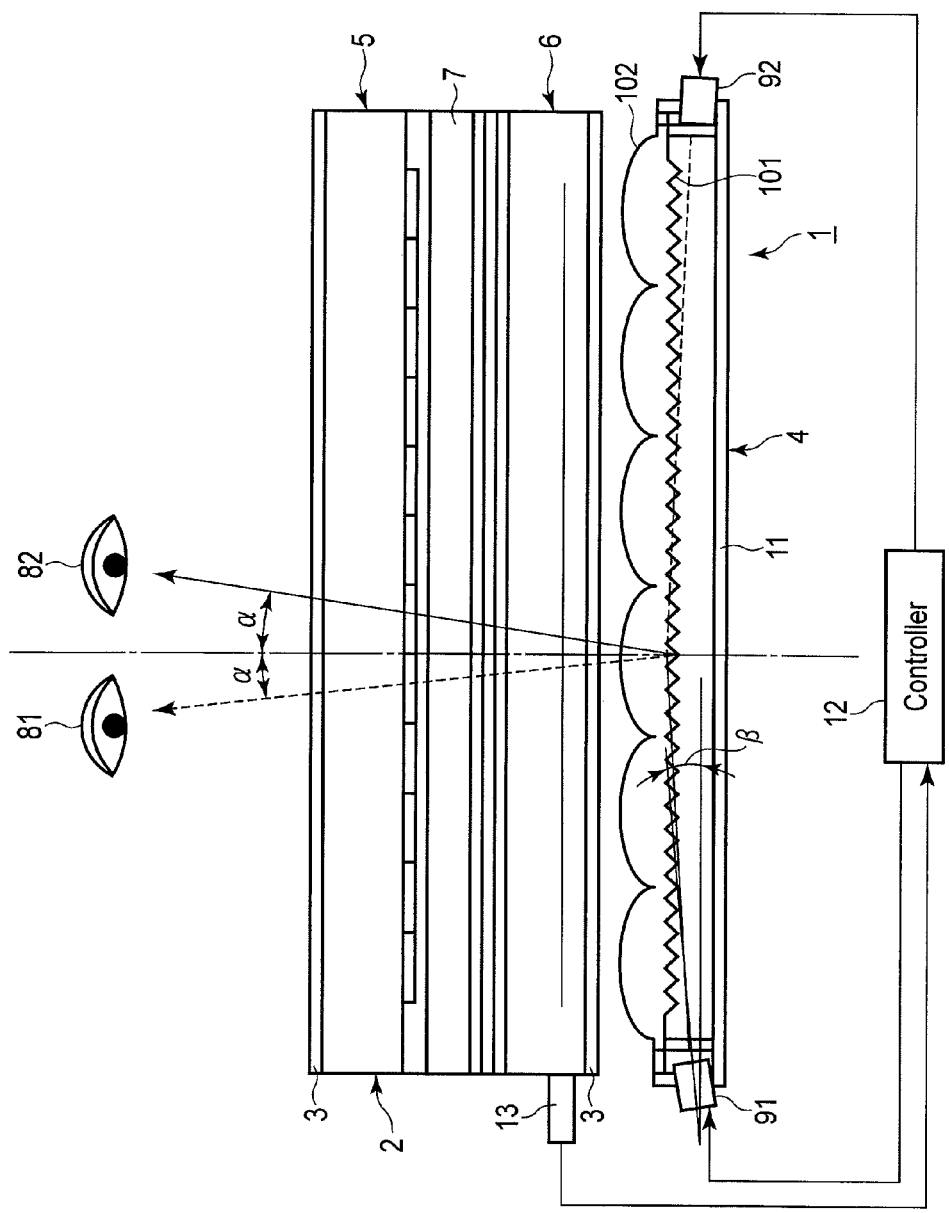
F I G. 1

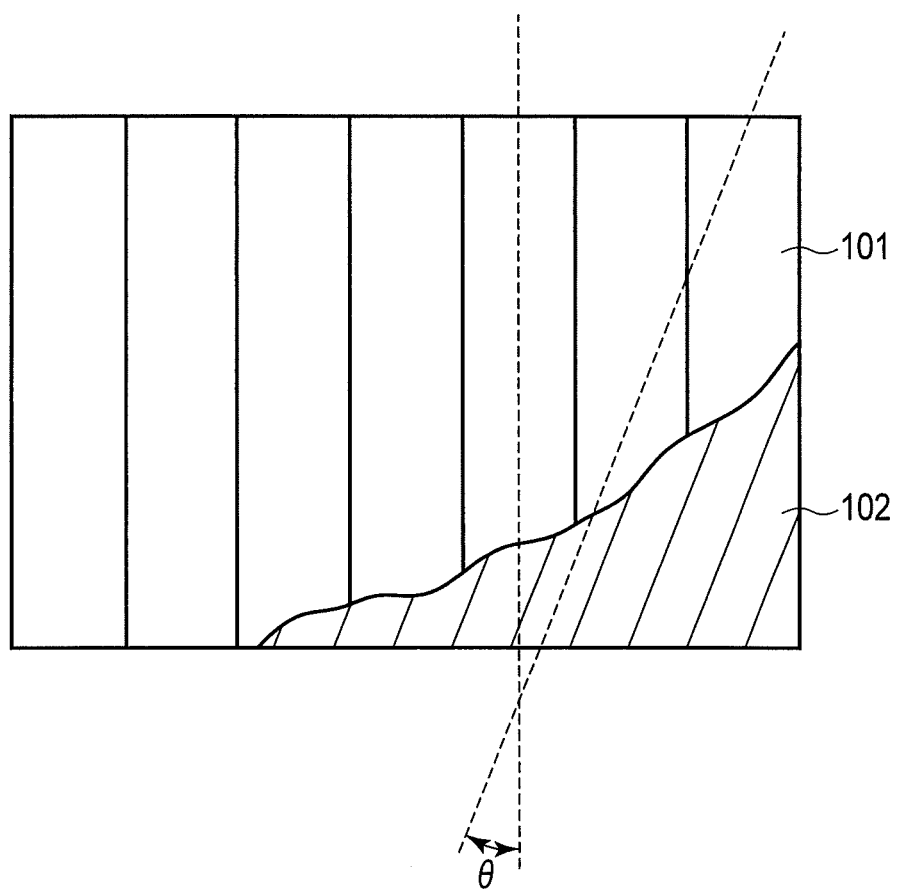
F I G. 2

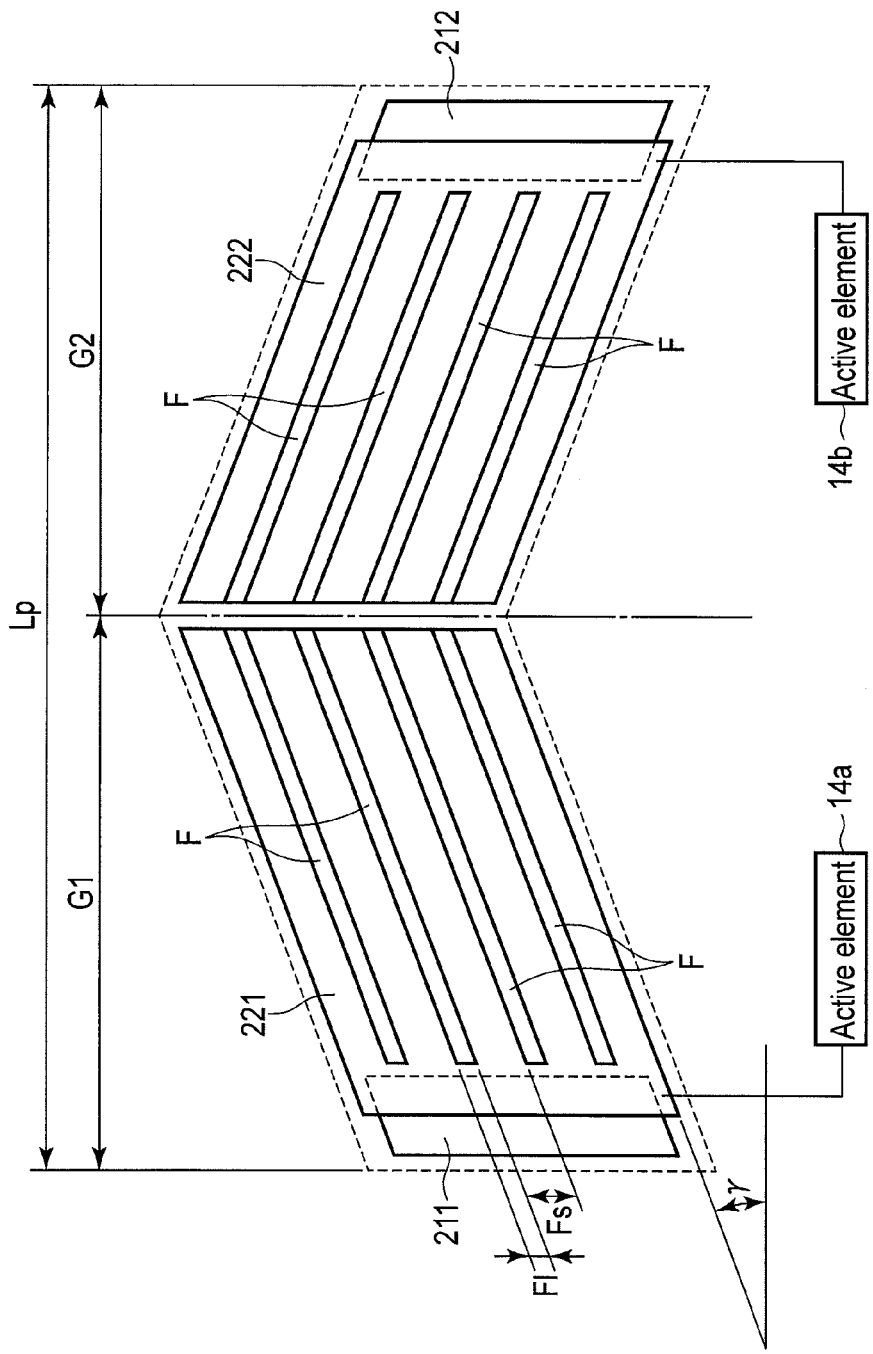
F I G. 14

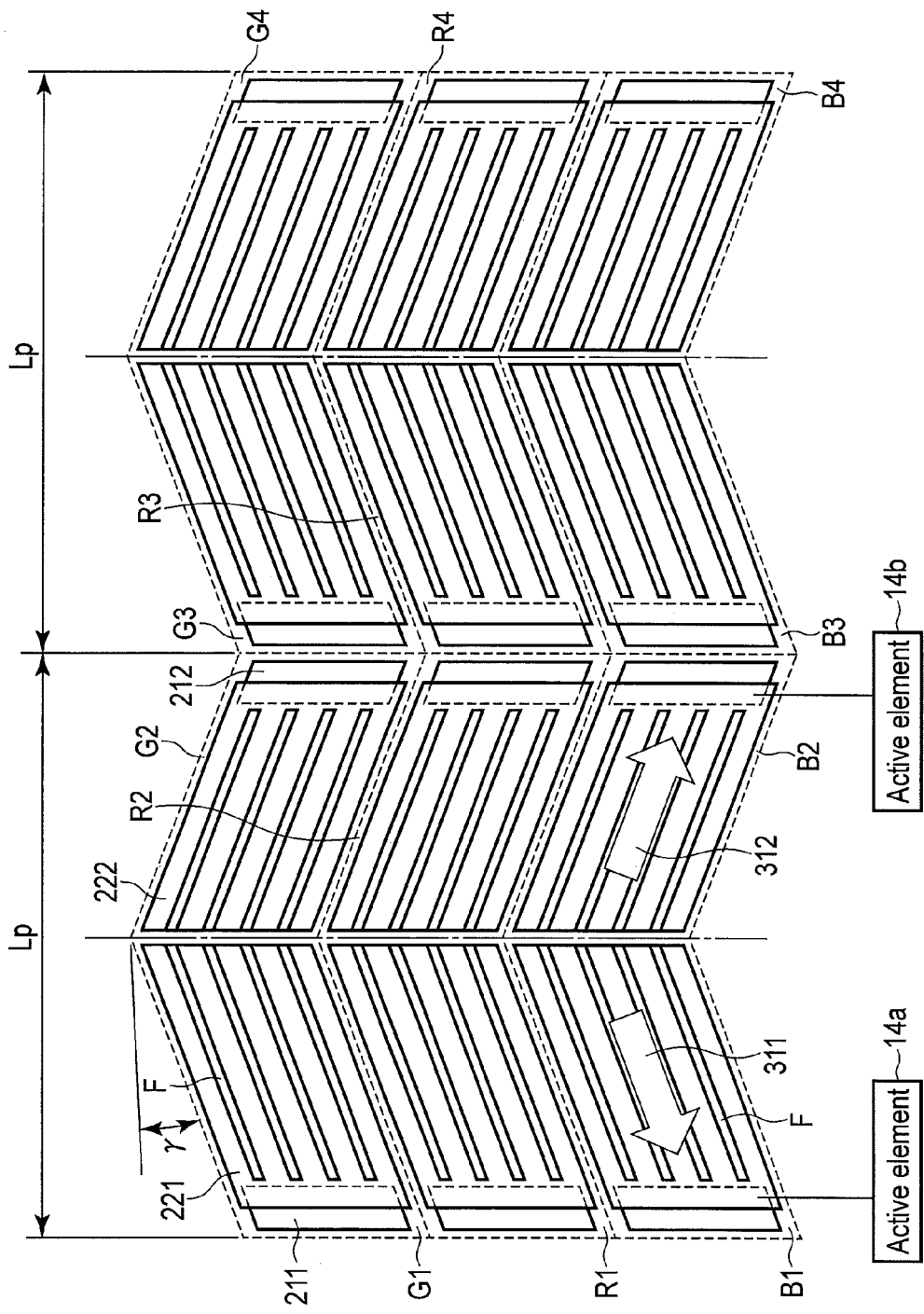
F I G. 15

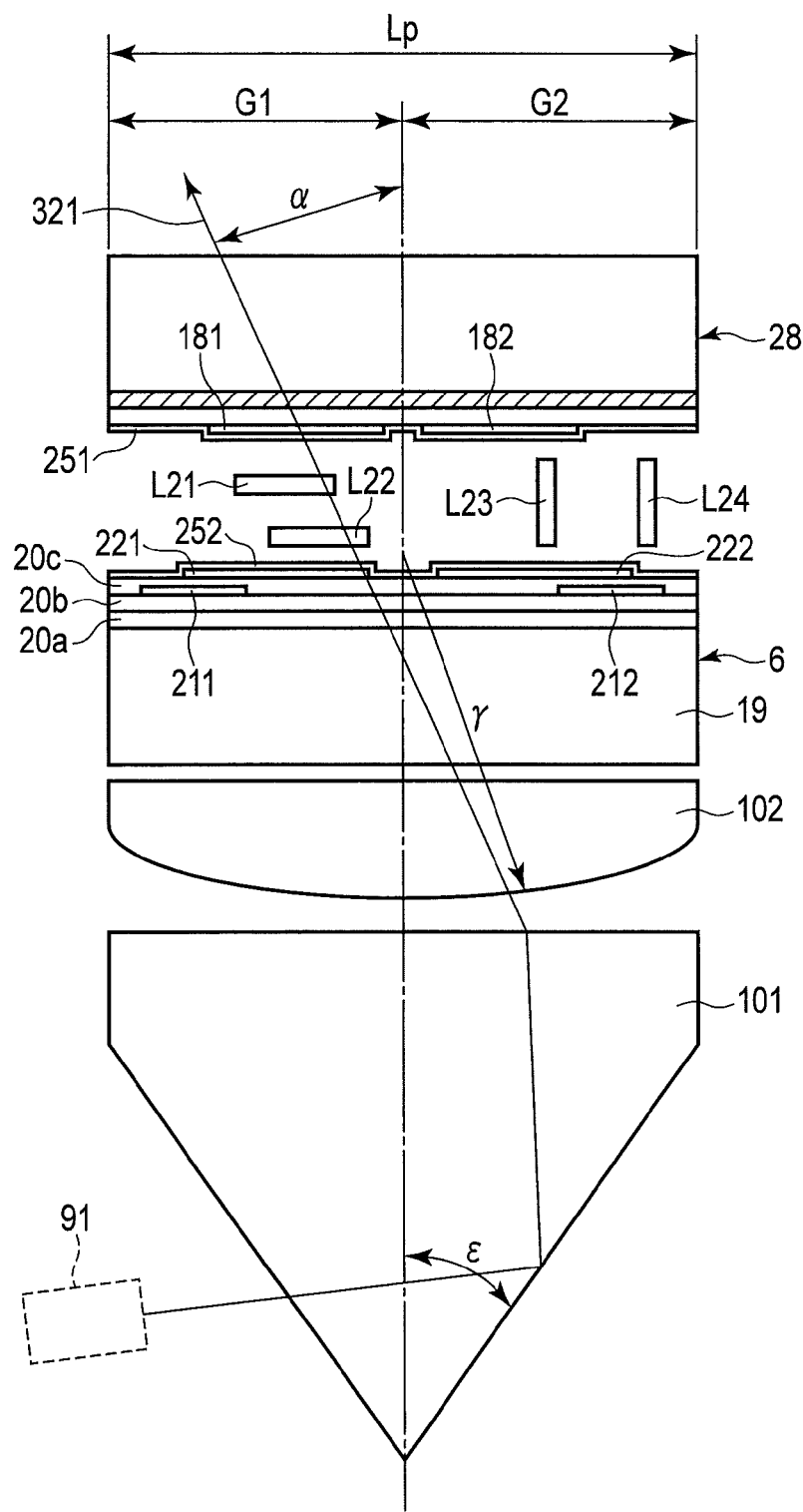
F I G. 16

LIQUID CRYSTAL DISPLAY DEVICE

CROSS-REFERENCE TO RELATED APPLICATIONS

This application is Continuation Application of PCT Application No. PCT/JP2013/057884, filed Mar. 19, 2013 and based upon and claiming the benefit of priority from the Japanese Patent Application No. 2012-094959, filed Apr. 18, 2012, the entire contents of all of which are incorporated herein by reference.

BACKGROUND OF THE INVENTION

1. Field of the Invention

The present invention relates to a liquid crystal display device.

2. Description of the Related Art

A liquid crystal cell of a general liquid crystal display device has a structure in which a liquid crystal layer is held by transparent substrates such as glass substrates. The liquid crystal display device includes a liquid crystal panel configured such that a polarizer, or a polarizer and a retardation plate, are disposed on the front and back of the liquid crystal cell.

In a first example, a liquid crystal display device includes a backlight unit as a light source on a back surface of a liquid crystal panel, which is on a side opposite to an observer. In a second example, a liquid crystal display device makes use of an external light source such as room light, in addition to a backlight unit.

In a liquid crystal display device which is capable of performing three-dimensional image display, and a liquid crystal display device which is capable of controlling a viewing angle, a liquid crystal panel which makes use of a backlight unit or an external light source is configured to control, according to purposes of display, an emission angle of light which is emitted to the outside from a front surface of the liquid crystal panel, which is on an observer side.

Various display methods are known for liquid crystal display devices, or display devices, which are capable of performing three-dimensional image display. These display methods include methods using glasses, and methods not using glasses. The methods using glasses include an anaglyph method which makes use of a difference in color, or a polarization-glasses method which makes use of polarization. In the method of using glasses, it is necessary for an observer to wear purpose-specific glasses at a time of three-dimensional image display, and this is troublesome. In recent years, there has been an increasing demand for methods which require no glasses.

In order to adjust the angle of light which is emitted from the liquid crystal panel to a single observer or plural observers (hereinafter, in some cases, "single observer" and "plural observers" are referred to as "two-view type" and "multi-view type", respectively), a study has been made of a technique of providing an optical control element on the front surface or back surface of the liquid crystal panel.

There is a case in which the optical control element is used in a liquid crystal display device which is capable of performing three-dimensional image display and requires no glasses.

An example of the optical control element is a lenticular lens which is configured such that optical lenses are arranged two-dimensionally, and realizes regular refraction. The lenticular lens is used such that a transparent resin or the like is processed in a sheet shape and attached to the front surface or back surface of a liquid crystal display device. Patent document 1 (Japanese Patent No. 4010564) and patent document 2 (Japanese Patent No. 4213226) disclose three-dimensional image display techniques using lenticular lenses (lenticular screens). Patent documents 3 to 8 (Jpn. Pat. Appln. KOKAI Publication No. 2010-506214, Jpn. Pat. Appln. KOKAI Publication No. 2010-524047, Jpn. Pat. Appln. KOKAI Publication No. 2010-541019, Jpn. Pat. Appln. KOKAI Publication No. 2010-541020, Japanese Patent No. 4655465, and Japanese Patent No. 3930021) disclose prism sheets including convex lenses.

The relationship between various arrangements of pixels (color pixels) of color filters and light-ray control elements (lenticular sheets) including aperture portions in a direction of the arrangement is disclosed in patent document 9 (Jpn. Pat. Appln. KOKAI Publication No. 2008-249887).

In addition, a technique of successively disposing color filters of the same color in a lateral direction is disclosed, for example, in Claim 1 of patent document 10 (Jpn. Pat. Appln. KOKAI Publication No. 2009-3002).

BRIEF SUMMARY OF THE INVENTION

In the above-described patent documents 1-8, lenticular lenses are used. Patent document 1 discloses a technique in which a display element (a pixel or a sub-pixel) is formed in a parallelogrammatic shape or a triangular shape, or a display element is disposed with an offset, thereby substantially providing an angle between a pixel (or a sub-pixel) array and a lenticular screen. Patent document 1, like patent document 2, discloses a technique of giving a successive (smooth) horizontal parallax to an observer. In patent document 1, there is a case in which aliasing occurs in display due to a substantially obliquely disposed pixel array and an edge of the lenticular screen crossing this pixel array. Patent document 1 discloses, for example, neither a technique of optimizing an alignment direction, in which liquid crystal molecules become line-symmetric, by using a three-dimensional optical control element, nor a technique of associating a triangular prism and a laterally elongated pixel, and effecting switching between a three-dimensional image and a two-dimensional image. Nor does patent document 1 disclose a technique of using liquid crystal molecules with a negative dielectric constant anisotropy in a liquid crystal display device for three-dimensional image display.

Patent document 2 discloses a technique in which an offset angle is provided between a major axis of a lenticular screen and a pixel array. In patent document 2, a loss in resolution of three-dimensional image display is reduced by a lenticule to which an offset angle is given, and smooth display is provided even when the head of the observer moves (the screen is smoothly switched). However, in patent document 2, since the edge of the obliquely disposed lenticular screen crosses the pixel array, there is a case in which aliasing occurs in display. Patent document 2 discloses, for example, neither a technique of optimizing a relationship between an alignment direction, in which liquid crystal molecules become line-symmetric, and a three-dimensional optical control element, nor a technique of associating a triangular prism and a laterally elongated pixel, and effecting switching between a three-dimensional image and a two-dimensional image. Nor does patent document 2 disclose a technique of using liquid crystal molecules with a negative dielectric constant anisotropy in a liquid crystal display device for three-dimensional image display.

In patent documents 3 to 6, a liquid crystal of an optically compensated bend (OCB) mode is applied to three-dimensional image display. In patent documents 3 to 6, OCB is explained merely from the standpoint of a response time of a liquid crystal, which is necessary for three-dimensional image display. However, none of patent documents 3 to 6 discloses a liquid crystal display device which optimizes light distribution by liquid crystal molecules per se, which are used in a liquid crystal panel, and enables bright three-dimensional image display and two-dimensional image display. For example, none of patent documents 3 to 6 discloses in which direction OCB liquid crystal molecules are to be arranged with respect to a light distribution angle of a light source for a right-eye image and a light distribution angle of a light source for a left-eye image, thereby to optimize three-dimensional image display for the right eye and left eye. In addition, there is a case in which the OCB liquid crystal has a lower viewing-angle characteristic than IPS (a liquid crystal panel of a lateral electric field using horizontally aligned liquid crystal molecules) or VA (a liquid crystal panel of a vertical electric field using vertically aligned liquid crystal molecules). The OCB liquid crystal requires, each time the panel is activated, a transition operation from a splay alignment, which is an initial alignment, to a bend alignment at a time of driving. Thus, there is a case in which the OCB liquid crystal is not preferable for a liquid crystal display device for small-sized mobile equipment.

Each of patent documents 3 to 7 discloses a double-surface prism sheet having a cross-sectional shape as disclosed in patent document 8. A liquid crystal display device of each of patent documents 3 to 7 performs three-dimensional image display by using light sources provided on both sides of the backlight unit. However, like patent document 8, none of patent documents 3 to 7 discloses a measure for eliminating moiré due to interference between the prism sheet and the liquid crystal panel, which tends to occur in three-dimensional image display. Furthermore, none of patent documents 3 to 7 discloses a liquid crystal display device which optimizes light distribution by liquid crystal molecules per se, which are provided in a liquid crystal panel, and enables bright three-dimensional image display and two-dimensional image display.

Patent document 8 discloses a double-surface prism sheet which includes a cylindrical lens row that is parallel to a triangular prism row, with a focus position of the cylindrical lens agreeing with an apex of the prism. FIG. 1 or FIG. 2 of patent document 8 illustrates a technique of effecting three-dimensional image display by using this double-surface prism sheet and both-side light sources provided on the backlight unit. However, in the technique of patent document 8, it is difficult to eliminate moiré due to interference between the cylindrical lens row and the liquid crystal panel, which tends to occur in three-dimensional image display. In addition, patent document 8 does not disclose a liquid crystal display device which optimizes light distribution by liquid crystal molecules per se, which are used in the liquid crystal panel, and enables bright three-dimensional image display and two-dimensional image display. Patent document 8 neither takes into account the matching between a color filter, which is generally used in a color liquid crystal display device, and the double-surface prism sheet, nor discloses the relationship in correspondency between the double-surface prism sheet and laterally elongated pixel. Furthermore, patent document 8 does not disclose optimization from the standpoint of the alignment of liquid crystal molecules used in the liquid crystal panel or the liquid crystal operation.

Patent document 9 discloses a combination between a light-ray control element, which is a lenticular sheet, and arrangements of color pixels. However, patent document 9 does not disclose a liquid crystal display device in which elongated color pixels are formed in a direction in which the two eyes of the observer are disposed, one active element is provided in one color pixel, and, when a liquid crystal layer is driven by active elements of neighboring color pixels, tilt directions of liquid crystal molecules become line-symmetric between laterally neighboring pixels, with respect to the center axis in the vertical direction of the two neighboring pixels. In addition, patent document 9 does not disclose a technique in which a picture element at a time of three-dimensional image display is composed of two red pixels, two green pixels and two blue pixels. Besides, patent document 9 does not disclose a liquid crystal display device including, on that surface of an array substrate which is opposite to a liquid crystal layer, an edge-lit-type light guide including a solid-state light-emission element array, and a unit for causing the solid-state light-emission element to emit light by applying a voltage to the solid-state light-emission element in synchronism with a video signal and an operation of liquid crystal molecules.

Patent document 10 discloses a technique in which color elements (color pixels) of the same color are arranged in a long-side direction of a display area and the color elements are arranged in stripes. However, patent document 10 does not disclose a technique of displaying a three-dimensional image by using a lenticular lens, for example, by using a liquid crystal alignment which is line-symmetric with respect to the long-side direction. Patent document 10 neither takes into account the synchronism with the solid-state light-emission element and the video signal, nor relates to a three-dimensional image display technique.

As regards the display of a three-dimensional image, an improvement in display quality is desired. However, none of patent documents 1 to 10 discloses a technique of line-symmetry driving the liquid crystal layer by active elements, the laterally elongated pixels agreeing with the direction in which the two eyes of the observer are disposed and the driving of the liquid crystal, or the optimal configuration of the lenticular lens and the solid-state light-emission element.

The present invention has been made in consideration of the above circumstances, and the object of the invention is to provide a liquid crystal display device for eliminating moiré which is incidental to three-dimensional image display, and for more brightly and effectively realizing three-dimensional display and two-dimensional display.

In the embodiment, a liquid crystal display device includes an array substrate, a color filter substrate, a liquid crystal layer, a backlight, and a controller. The array substrate includes a plurality of pixel electrodes corresponding to a plurality of pixels arranged in a matrix. The color filter substrate is opposed to the array substrate and includes color filters corresponding to the plurality of pixels. The liquid crystal layer is provided between the array substrate and the color filter substrate. The backlight unit is provided on a back surface side of the array substrate, the back surface side being opposite to a liquid crystal layer side of the array substrate. The controller is configured to control an application timing of a liquid crystal driving voltage to the pixel electrodes, and a light emission timing of the backlight unit. The plurality of pixels are configured to each have a shape which is elongated in a lateral direction, and configured such that identical colors are arranged in the lateral direction, and different colors are arranged in a vertical direction. Pixels neighboring in the lateral direction of the plurality of pixels have shapes of line-symmetry with respect to a center line of the neighboring pixels. Liquid crystal molecules of the neighboring pixels tilt in directions of the line-symmetry with respect to the center line when the liquid crystal driving voltage is applied to the pixel electrodes corresponding to the neighboring pixels.

In the embodiment of the invention, display non-uniformity such as moiré can be eliminated, a three-dimensional image with a high display quality can be displayed, three-dimensional display and two-dimensional display can be switched, and three-dimensional display and two-dimensional display can be more brightly and effectively realized.

BRIEF DESCRIPTION OF THE SEVERAL VIEWS OF THE DRAWINGS

FIG. 1 is a cross-sectional view illustrating an example of a liquid crystal display device according to a first embodiment.

FIG. 2 is a plan view illustrating an example of a cylindrical lens and a triangular prism of an optical control element according to the first embodiment.

FIG. 14 is a plan view illustrating an example of a shape of pixel electrodes of two neighboring pixels of the liquid crystal display device according to the second embodiment.

FIG. 15 is a plan view illustrating an example of the shape of pixel electrodes of plural pixels and tilt directions of liquid crystal molecules in the liquid crystal display device according to the second embodiment.

FIG. 16 is a cross-sectional view illustrating an example of synchronization between a pixel electrode of one of two neighboring pixels and a solid-state light emission element.

DETAILED DESCRIPTION OF THE INVENTION

Figure 3:
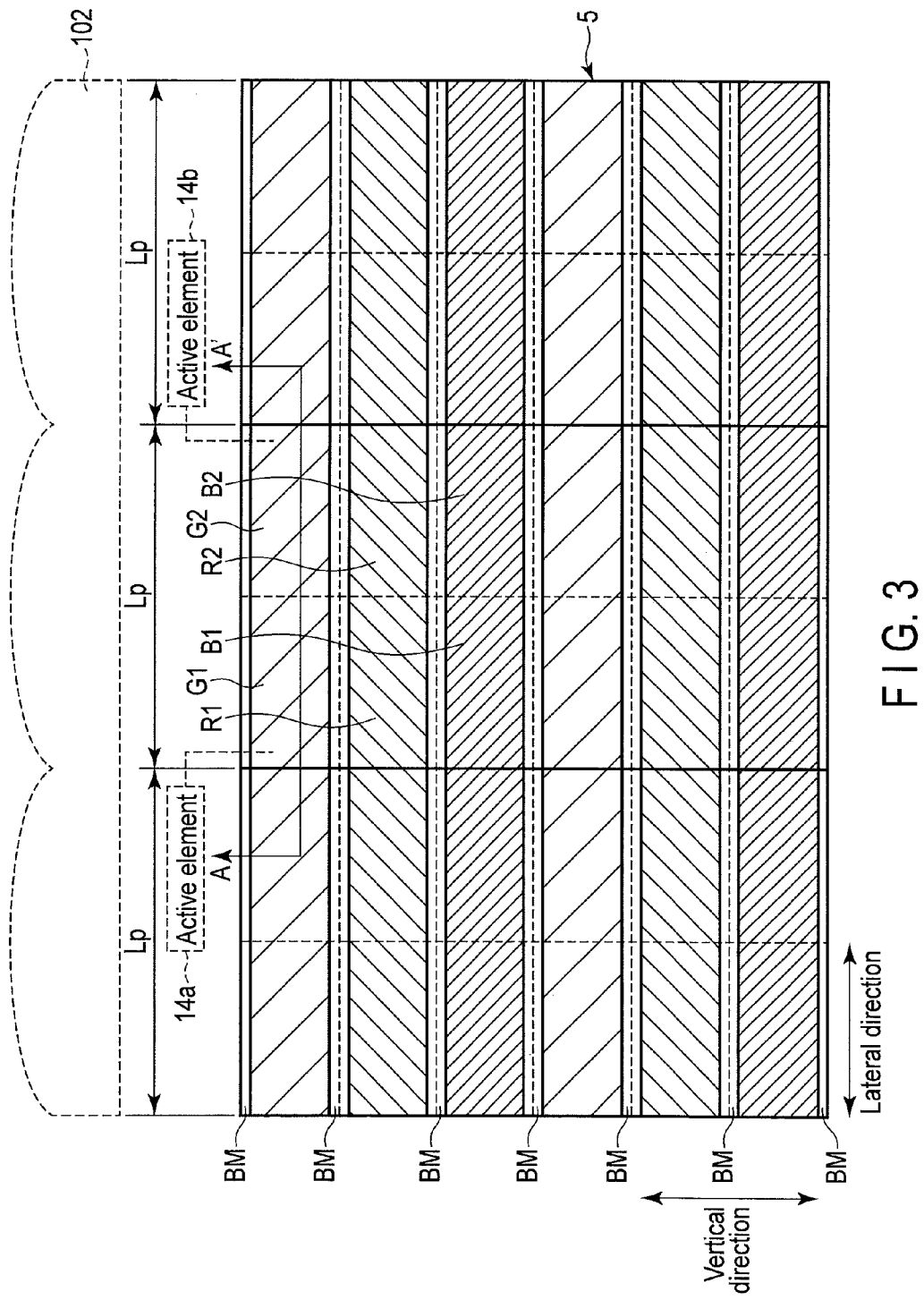
FIG. 3 is a plan view illustrating an example of a color filter substrate of the liquid crystal display device according to the first embodiment.

Embodiments of the invention will be described hereinafter with reference to the accompanying drawings. In the description below, identical or substantially identical functions and structural elements are denoted by like reference numerals, and a description thereof is omitted, or a description is given only where necessary.

In the embodiments below, only characteristic parts will be described, and a description is omitted of parts which are not different from structural elements of ordinary liquid crystal display devices.

In the embodiments below, a pixel may be a sub-pixel. By way of example, a display unit of a liquid crystal display device is assumed to be a picture element which is composed of six pixels including two red pixels, two green pixels and two blue pixels. However, the number of pixels included in the picture element may be freely changed.

In the embodiments below, a direction of arrangement of pixels, which is parallel to a direction of disposition of the right and left eyes of an observer is defined as a lateral direction, and a direction of arrangement of pixels, which is perpendicular to this lateral direction, is defined as a vertical direction.

A color pixel has a shape which is long in the lateral direction. In the description below, there is a case in which the lateral direction is described as a pixel longitudinal direction. The color pixel has a shape which is short in the vertical direction. In the description below, there is a case in which the vertical direction is described as a pixel transverse direction.

In the description below, there is a case in which two pixels of the same color are described as a pair. In addition, in the picture element including six pixels, it is assumed that two pixels of the same color are arranged in the lateral direction, and pixels of three different colors are arranged in the vertical direction.

First Embodiment

FIG. 1 is a cross-sectional view illustrating an example of a liquid crystal display device according to the embodiment. FIG. 1 shows a cross section in the lateral direction.

A liquid crystal display device 1 includes, as basic structural elements, a liquid crystal panel 2, polarizers 3, a backlight unit 4, and a controller 12. The polarizer 3 may be formed by attaching a retardation plate.

In each of the embodiments below, a pair of polarizers 3 may be configured as crossed Nicols. In addition, the absorption axes of the paired polarizers 3 may be made parallel, and the liquid crystal display device 1 may include a spiral element between one of the polarizers 3 and the liquid crystal panel 2, the spiral element being configured to convert first linearly polarized light of this one of the polarizers 3 to second linearly polarized light which is perpendicular to the first linearly polarized light.

The liquid crystal panel 2 includes a color filter substrate 5, an array substrate 6 and a liquid crystal layer 7. The color filter substrate 5 and the array substrate 6 are opposed to each other. The liquid crystal layer 7 is interposed between the color filter substrate 5 and the array substrate 6.

In the present embodiment, a plurality of pixels are disposed in a matrix.

The liquid crystal panel 2 includes red pixels, green pixels and blue pixels. In the embodiment, each pixel is longer in the lateral direction than in the vertical direction, when viewed in plan.

The lateral direction, as described above, is the direction in which the right eye 81 and left eye 82 of the observer are disposed. In the embodiment, it is assumed that neighboring pixels of the same color are arranged in the lateral direction (a horizontal direction in a lateral-directional cross section of FIG. 1). The polarizers 3, retardation plates (not shown), etc. are provided on a front surface (a plane on the observer side) side and a back surface (a plane on a side opposite to the observer) side of the liquid crystal panel 2.

The backlight unit 4 is provided on the back surface of the liquid crystal panel 2 (the back surface side of the array substrate 6, which is opposite to the liquid crystal layer 7 side) via the polarizer 3. The backlight unit 4 includes, as basic structural elements, solid-state light emission elements 91, 92, such as LEDs (light-emitting diodes), an optical control element 101 which is an array of triangular prisms, an optical control element 102 which is an array of cylindrical lenses, and a reflection plate 11.

The array of cylindrical lenses shown in FIG. 1 has a longitudinal (longer-side) direction in a direction perpendicular to the lateral-directional cross section of FIG. 1. The optical control element 101, which is the array of triangular prisms, and the optical control element 102, which is the array of cylindrical lenses, may be formed of an acrylic resin or the like, and may be formed as an integral molded article of back-to-back attachment.

The pitch of the array of triangular prisms and the pitch of the array of cylindrical lenses may be in a relationship of 1:1, or, as illustrated in FIG. 1, the pitch of the array of triangular prisms may be set to be finer than the pitch of the array of cylindrical lenses.

As illustrated in FIG. 2, an angle θ is provided between a longitudinal axis of the cylindrical lens and a longitudinal axis of the triangular prism.

The plural triangular prisms have an angle θ to the vertical direction. The plural triangular prisms are arranged with a fine pitch. The angle θ may be set in a range of, e.g. 3° to 42°. The angle θ may be greater than this range. The angle θ is set at such an angle as not to interfere with the optical axis of the polarizer or liquid crystal alignment.

The backlight unit 4 may include, for example, a diffusion plate, a light guide plate, a polarization split film, and a retroreflection polarization element, but these components are omitted in FIG. 1.

The solid-state light emission element 91, 92 may be, for instance, a white LED which emits white light including three wavelengths of red, green and blue in the light emission wavelength range. The solid-state light emission element 91, 92 may be, for instance, a pseudo-white LED in which a GaN-based blue LED and a YAG-based phosphor material are combined. In order to enhance color rendering properties, an LED with a major peak of one color or more, such as a red LED, may be used together with a pseudo-white LED. For example, use may be made of a light source in which red and green phosphors are stacked on a blue LED.

The backlight unit 4 may include a plurality of solid-state light emission elements 91 and a plurality of solid-state light emission elements 92. In this case, the plurality of solid-state light emission elements 91 and the plurality of solid-state light emission elements 92 may include LEDs which individually emit any one of red, green and blue. The plurality of solid-state light emission elements 91 and the plurality of solid-state light emission elements 92 may include LEDs which emit light of an ultraviolet range, or may include LEDs of an infrared range.

The controller 12 executes various control processes in the liquid crystal display device 1. For example, the controller 12 controls the timing of application of a liquid crystal driving voltage to pixel electrodes 221, 222, and the timing of light emission of the backlight unit 4. For example, the controller 12 realizes three-dimensional image display by synchronizing and controlling the timing of light emission of the solid-state light emission elements 91, 92, and the timing of application of a driving voltage of the liquid crystal layer 7, based on a right-eye video signal and a left-eye video signal.

In the meantime, the liquid crystal display device 1 may include a light reception element 13. In this case, the light reception element 13 is used for data input by an optical sensor. For example, the light reception element 13 detects specific-wavelength light which is emitted from a light emission element such as an ultraviolet-range or infrared-range LED. The controller 12 detects a position of the light-reception element 13, where specific-wavelength light has been detected. In addition, for example, based on the light detected by the light reception element 13, the controller 12 detects the position of the observer or the position of a pointer such as a finger. The light reception element 13 may be an oxide semiconductor active element with a transparent channel layer formed of a composite metal oxide, or may be capable of detecting light of the ultraviolet range. The light reception element 13 may be an image-pickup element (camera) such as a CMOS or CCD, which is mounted on the housing of the liquid crystal display device. This light reception element 13 may be used for biometrics authentication or personal authentication, in addition to touch sensing and image pickup. In addition, the light reception element 13 may be, for example, a plurality of optical sensors which are provided in a matrix on the array substrate 6.

The controller 12 detects, for example, the position of the observer, based on an output value of the light reception element 13, and adjusts an emission angle β of emission light from the solid-state light emission element 91, 92, based on the position of the observer. Thereby, an emission angle α to the two eyes (right eye 81 and left eye 82) of the observer can be adjusted, and the visibility of a three-dimensional image can be improved.

FIG. 3 is a plan view illustrating an example of the color filter substrate 5 of the liquid crystal display device 1 according to the embodiment. FIG. 3 is a front view of the color filter substrate 5, and illustrates a state in which the color filter substrate 5 is viewed from the observer. Incidentally, in FIG. 3, in order to compare the size of the pixel and the size of the cylindrical lens, a cross section of the optical control element 102 including an array of cylindrical lenses is depicted by a broken line as a point of reference.

Each pixel has a laterally elongated shape. In FIG. 3, each pixel has a rectangular shape with long sides in the lateral direction and short sides in the vertical direction. Two pixels of the same color are arranged in juxtaposition. A plurality of pixels of the same color are arranged in the lateral direction, and a plurality of pixels of different colors are arranged in the vertical direction. Those pixels of the plural pixels, which neighbor in the lateral direction, have a shape of line-symmetry with respect to a center line of the neighboring pixels. The plural pixels include a picture element which is composed of laterally arranged green pixels G1 and G2, red pixels R1 and R2 and blue pixels B1 and B2.

A black matrix BM partitions the pixels. In FIG. 3, the black matrix BM is formed between vertically neighboring pixels, and is not formed between the laterally neighboring pixels. Specifically, the black matrix BM is formed at an upper side and a lower side of each pixel.

Under the color filter substrate 5, the array substrate 6 is provided via the liquid crystal layer 7. In other words, the color filter substrate 5 and array substrate 6 are opposed. The liquid crystal layer 7 is provided between the color filter substrate 5 and array substrate 6. The array substrate 6 includes active elements 14a, 14b. As the active element 14a, 14b, for example, a thin-film transistor (TFT) is used. Incidentally, the array substrate 6 may be configured to include some other active element as a light reception element.

In the description below, pixels G1 and G2 will be described as typical examples, but other pixels have the same features.

A width Lp of two pixels G1 and G2 in the lateral direction is made to agree with the width of a semicylindrical lens. The pixel G1, G2 may be configured to include a light reception element 13 used as an optical sensor, in addition to the active element 14a, 14b which drives the liquid crystal layer 7.

Figure 4:
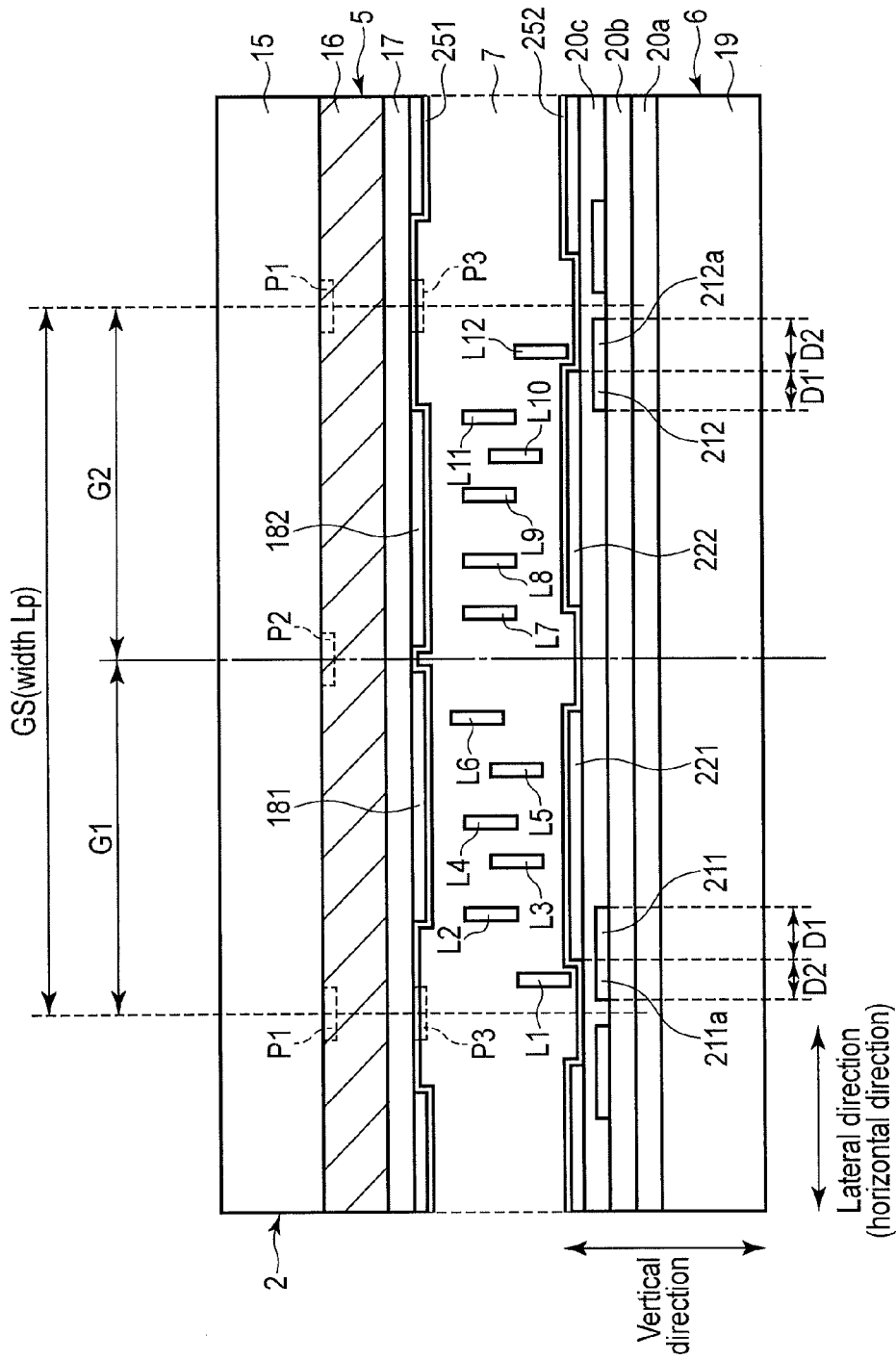
FIG. 4 is a cross-sectional view illustrating an example of the liquid crystal display device according to the first embodiment.

FIG. 4 is a cross-sectional view illustrating an example of the liquid crystal display device 1 according to the embodiment. FIG. 4 corresponds to an A-A' cross section in FIG. 3. Plural green pixels G1 and G2 are formed in juxtaposition in the lateral direction (horizontal direction).

The color filter substrate 5 is configured such that a black matrix BM, a color filter (color layer) 16, a transparent resin layer 17, counter-electrodes 181, 182, and an alignment sustaining layer (or alignment film) 251 are formed on a transparent substrate 15. In the cross section of FIG. 4, the black matrix BM is not depicted, but the black matrix BM is formed, for example, between the transparent substrate 15 and color filter 16. The counter-electrodes 18 are formed of, for example, transparent, electrically conductive films (ITO). The color filter substrate 5 includes color filters 16 corresponding to the plural pixels. Of the color filters 16, a green filter is associated with the green pixel, a red filter is associated with the red pixel, and a blue filter is associated with the blue pixel.

In the liquid crystal display device 1, the transparent substrate 15 side of the color filter substrate 5 faces the observer, and the alignment sustaining layer 251 side of the color filter substrate 5 faces the liquid crystal layer 7. In FIG. 4, polarizers are omitted.

For example, in a case where priority is placed on the contrast in two-dimensional image display rather than in three-dimensional image display, a black matrix BM in the vertical direction may be formed, for example, at positions P1 of end portions of a pixel set GS composed of two pixels G1 and G2, and at a position P2 at a central part of the two pixels G1 and G2. The positions P1, P2 are between the transparent substrate 15 and color filter 16 in the vertical direction (the direction of stacking of layers of the liquid crystal panel 2) of the cross section of FIG. 4.

In order to reduce crosstalk (to reduce the effect on neighboring pixels) in liquid crystal display, counter-electrodes functioning as common electrodes may be formed at positions P1 or P3. The positions P3 are the positions of end portions of the pixel set GS in the lateral direction and are located between the transparent resin layer 17 and liquid crystal layer 7 in the vertical direction of the cross section of FIG. 4.

When high responsivity of a liquid crystal is not required, the counter-electrodes 18 may be formed between the transparent substrate 15 and color filter 16 as plate-shaped electrodes or solid electrodes (with no pattern formation). The counter-electrodes 18 may be formed between the color filter 16 and black matrix BM as plate-shaped electrodes or solid electrodes.

The counter-electrode 181 of the pixel G1 and the counter-electrode 182 of the pixel G2 are formed symmetric with respect to the center axis of the pixel set GS.

The array substrate 6 is configured such that insulation layers 20a and 20b, common electrodes 211, 212, an insulation layer 20c, pixel electrodes 221 and 222, and an alignment sustaining layer 252 are formed on the transparent substrate 19. For example, SiN is used for the insulation films 20a to 20c. The array substrate 6 includes a plurality of pixel electrodes 221, 222, which correspond to the plural pixels G1, G2.

In the liquid, crystal display device 1, the transparent substrate 19 side of the array substrate 6 is the back side of the liquid crystal panel 2, and the alignment sustaining layer 252 side of the array substrate 6 faces the liquid crystal layer 7.

The pixel electrode 221 of the pixel G1 and the pixel electrode 222 of the pixel G2 are formed in line-symmetry with respect to the center axis of the pixel set GS.

Similarly, the common electrode 211 of the pixel G1 and the common electrode 212 of the pixel G2 are formed in symmetry with respect to the center line of the pixel set GS.

In the present embodiment the electrode configuration of the pixel set GS is line-symmetric. Specifically, the positions of the electrodes of the two neighboring pixels G1 and G2 are line-symmetric. When a voltage has been applied between the pixel electrode 221, 222 and the common electrode 211, 212, or between the pixel electrode 221, 222 and the counter-electrode 181, 182, the inclination of the liquid crystal of the liquid crystal layer 7 in the pixel GS becomes line-symmetric.

The common electrode 211, 212 and the pixel electrode 221, 222 in the same pixel have an overlapping portion with a width D1 at positions in the lateral direction. This overlapping portion can be used as a storage capacitance for liquid crystal display.

The common electrode 211, 212 includes a protrusion portion (protrusion electrode) 211a, 212a, with a width D2, which protrudes from the pixel electrode 221, 222 toward the end portion side of the pixel set GS in the lateral direction. The protrusion portions 211a, 212a protrude in opposite directions.

The common electrodes 211, 212 and pixel electrodes 221, 222 are formed of, for example, transparent, electrically conductive films.

The common electrodes 211, 212, which are included in the laterally neighboring pixels, respectively, have shapes of line-symmetry with respect to the center line of the laterally neighboring pixels G1, G2.

The liquid crystal layer 7 includes liquid crystal molecules L1 to L12 with initial vertical alignment. Each of the liquid crystal molecules L1 to L12 has a negative dielectric constant anisotropy.

Figure 5:
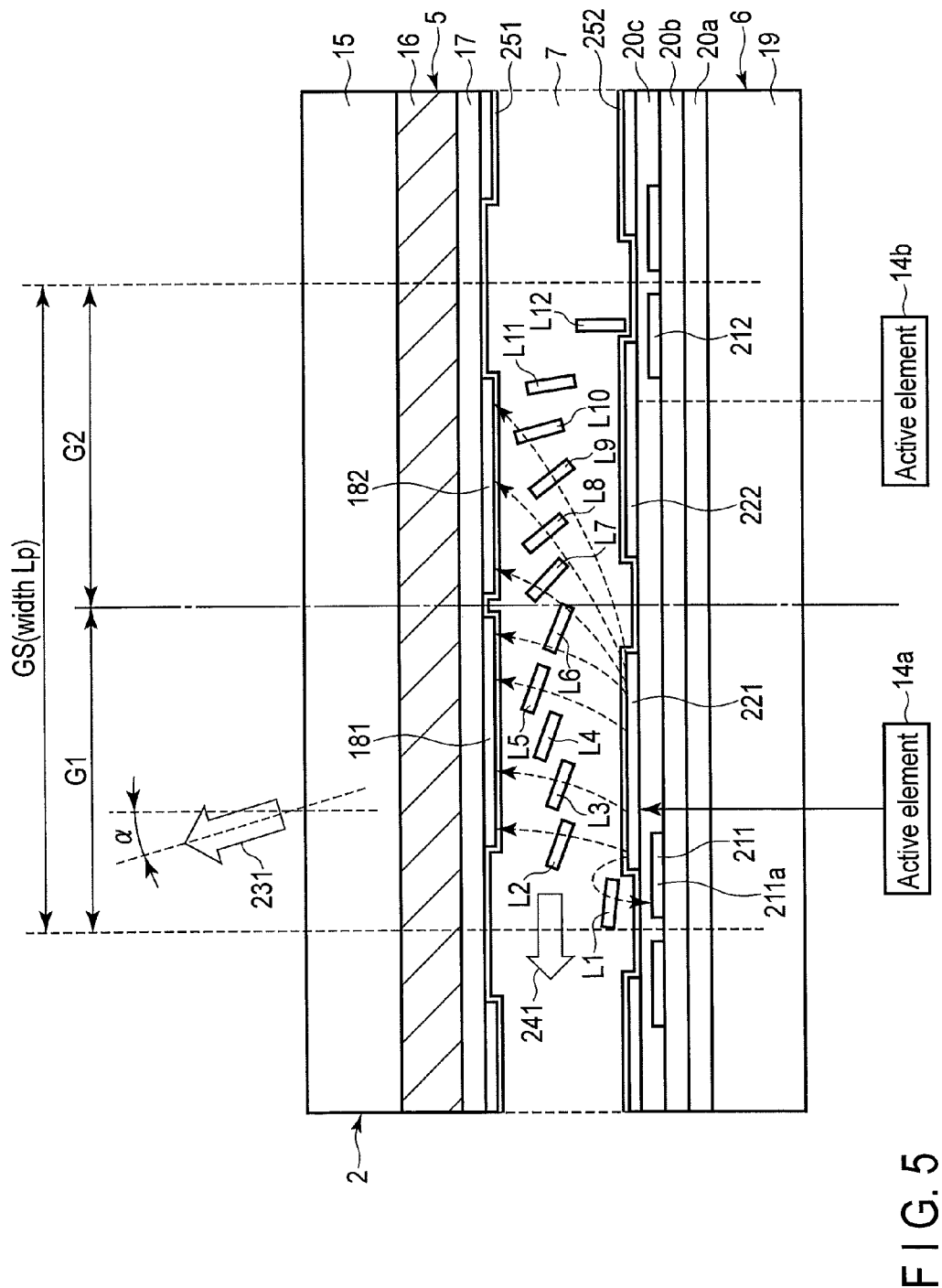
FIG. 5 is a cross-sectional view illustrating an example of a liquid crystal operation and emission light at a time when a liquid crystal driving voltage is applied to a pixel electrode of one of two neighboring pixels.
Figure 6:
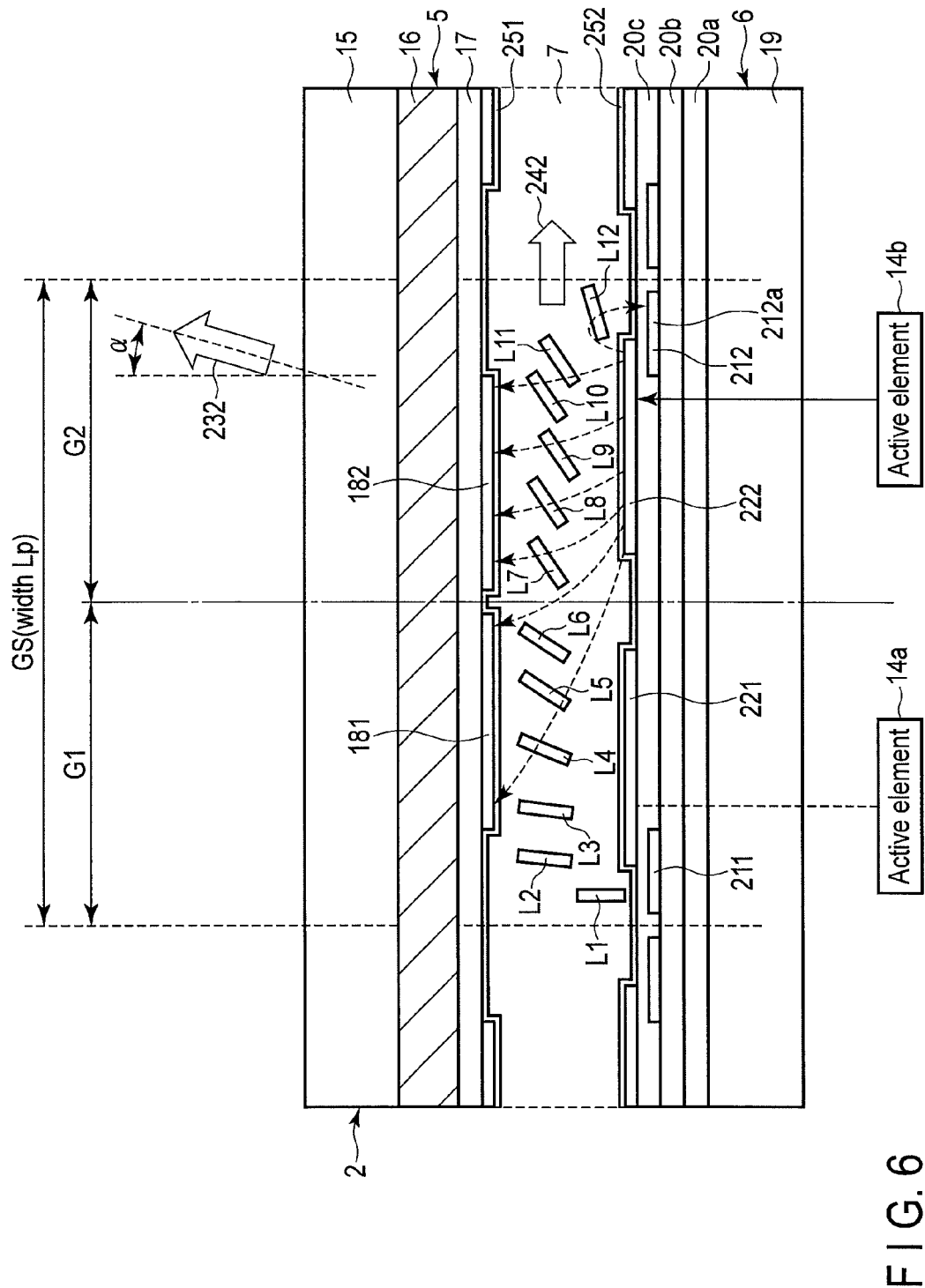
FIG. 6 is a cross-sectional view illustrating an example of the liquid crystal operation and emission light at a time when a liquid crystal driving voltage is applied to a pixel electrode of the other of the two neighboring pixels.
Figure 7:
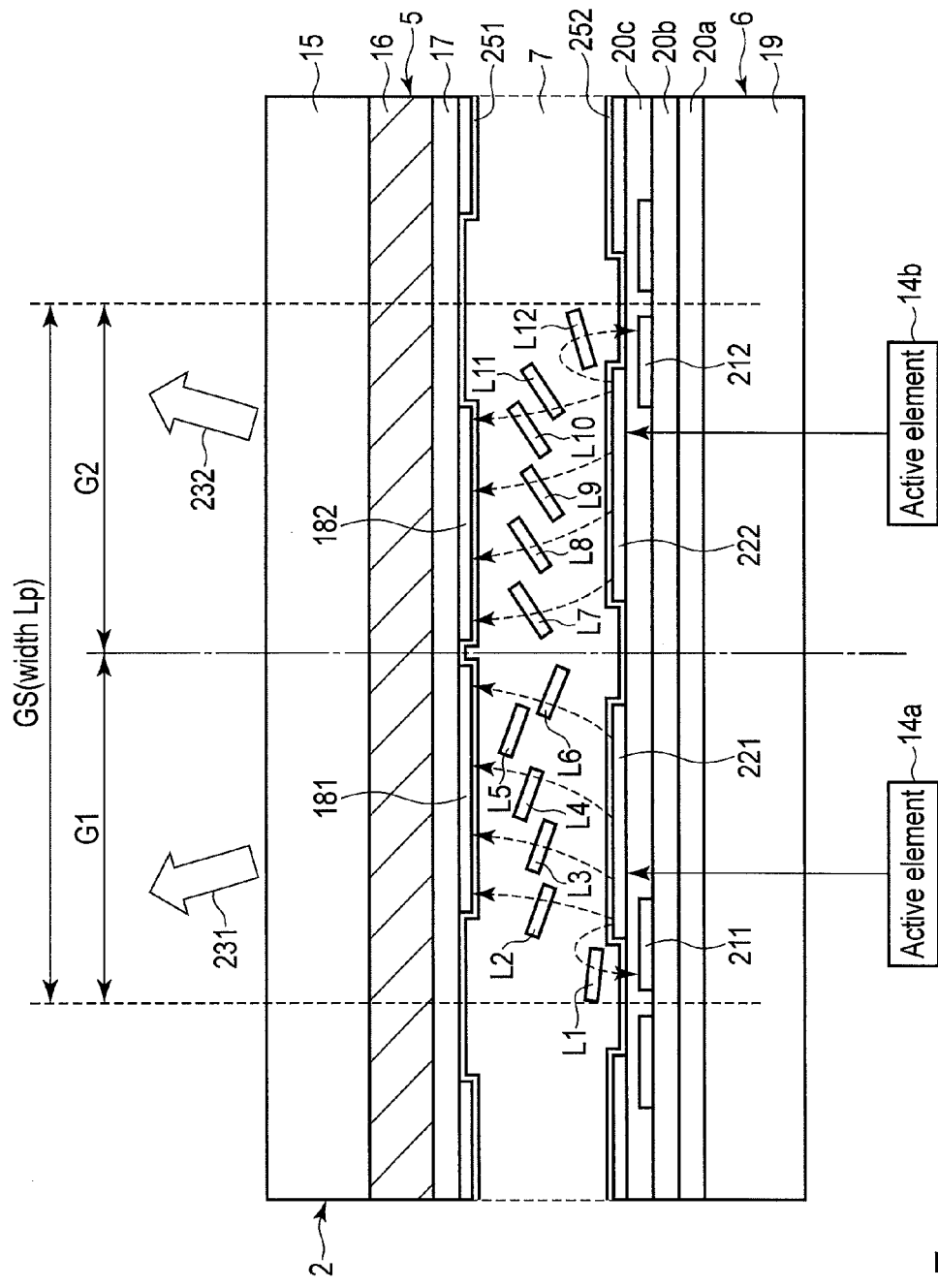
FIG. 7 is a cross-sectional view illustrating an example of the liquid crystal operation and emission light at a time when a liquid crystal driving voltage is applied to the the pixel electrodes of the two neighboring pixels.

Referring to FIG. 5 to FIG. 7, a description is given of the operation of the protrusion portion 211a, 212a.

FIG. 5 is a cross-sectional view illustrating an example of the liquid crystal operation and emission light 231 at a time when a liquid crystal driving voltage is applied to the pixel electrode 221 of one of the two neighboring pixels.

In FIG. 5, the active element 14a applies a voltage to the pixel electrode 221. Then, an electric field from the pixel electrode 221 to the common electrode 211 occurs. In addition, an oblique electric field from the pixel electrode 221 to the counter-electrode 181 and counter-electrode 182 occurs. The liquid crystal molecules L1 to L11 with initial horizontal alignment tilt in a direction of an arrow 241, in a manner to become perpendicular to electric force lines generated by applying the voltage to the pixel electrode 221.

By this liquid crystal operation, leftward emission light 231 is emitted. As described above, the angle α of the emission light 231 is adjusted by the optical control element 101, 102.

The liquid crystal molecule L1 on the protrusion portion 211a tilts greatly and quickly, based on a substantially strong electric field from the edge portion of the pixel electrode 221 toward the common electrode 211a.

With the tilt of the liquid crystal molecule L1 as a trigger, the liquid crystal molecules L2 to L11 tilt successively and instantaneously.

In the present embodiment, even when the voltage is applied to the pixel electrode 221 of the pixel G1, the liquid crystal molecules L7 to L11, which is disposed in the neighboring pixel G2, can be tilted, and bright three-dimensional image display can be realized.

FIG. 6 is a cross-sectional view illustrating an example of the liquid crystal operation and emission light 232 at a time when a liquid crystal driving voltage is applied to the pixel electrode 222 of the other of the two neighboring pixels.

In FIG. 6, the active element 14a applies a voltage to the pixel electrode 222. Then, an electric field from the pixel electrode 222 to the common electrode 212 occurs. In addition, an oblique electric field from the pixel electrode 222 to the counter-electrode 182 and counter-electrode 181 occurs. The liquid crystal molecules L12 to L2 with initial horizontal alignment tilt in a direction of an arrow 242, in a manner to become perpendicular to electric force lines generated by applying the voltage to the pixel electrode 222. The tilt direction of the liquid crystal molecules L12 to L2 in FIG. 6 is opposite to the tilt direction of the liquid crystal molecules L1 to L11 in FIG. 5, and is in line-symmetry with respect to the center axis of the pixels G1, G2.

By this liquid crystal operation, rightward emission light 232 is emitted. As described above, the angle α of the emission light 232 is adjusted by the optical control element 101, 102.

The liquid crystal molecule L12 on the protrusion portion 212a tilts greatly and quickly, based on a substantially strong electric field from the edge portion of the pixel electrode 222 toward the common electrode 212a.

With the tilt of the liquid crystal molecule L12 as a trigger, the liquid crystal molecules L11 to L2 tilt successively and instantaneously.

In the present embodiment, even when the voltage is applied to the pixel electrode 222 of the pixel G2, the liquid crystal, L2 to L6, which is disposed in the neighboring pixel G1, can be tilted, and bright three-dimensional image display can be realized.

By executing, in synchronism, the liquid crystal operation illustrated in FIG. 5 and FIG. 6 and the light emission of the solid-state light emission elements 91 and 92, it is possible to perform three-dimensional image display or to display different images in the direction of the right eye 81 and in the direction of the left eye 82.

FIG. 7 is a cross-sectional view illustrating an example of the liquid crystal operation and emission light 231, 232 at a time when a liquid crystal driving voltage is applied to the pixel electrodes 221, 222 of the two neighboring pixel G1 and G2.

In this embodiment, if a liquid crystal driving voltage is applied to the pixel electrodes 221 and 222 corresponding to the neighboring pixel G1 and G2, the liquid crystal molecules of the neighboring pixels G1 and G2 tilt in line-symmetric directions with respect to the center axis.

By applying a voltage to the pixel electrodes 221 and 222 of the two neighboring pixel G1 and G2, bright two-dimensional image display with a large viewing angle can be realized.

In this manner, the liquid crystal display device 1 according to the embodiment can very easily effect switching between a three-dimensional image and a two-dimensional image.

In the present embodiment, the description has been given by using liquid crystal molecules L1 to L12 with negative dielectric constant anisotropy. However, this embodiment is similarly applicable to liquid crystal molecules with positive dielectric constant anisotropy. In the case where liquid crystal molecules with positive dielectric constant anisotropy are applied, it is assumed that the liquid crystal molecules have initial horizontal alignment. If a driving is applied, liquid crystal molecules, whose longitudinal direction is parallel to the substrate plane, rise in a direction perpendicular to the substrate plane.

As the liquid crystal material, for example, a liquid crystal material including fluorine atoms in a molecular structure (hereinafter referred to as "fluorine-based liquid crystal") is preferable. The fluorine-based liquid crystal is low in viscosity and dielectric constant, and is small in amount of taken-in ionic impurities. In the case where the fluorine-based liquid crystal is used as the liquid crystal material, the degradation in capability, such as a decrease in voltage retention ratio due to impurities, is small, and display non-uniformity and display image persistence can be suppressed. As the liquid crystal with negative dielectric constant anisotropy, for example, a nematic liquid crystal having a birefringence index of about 0.1 in the neighborhood of room temperature can be used. As the liquid crystal with positive dielectric constant anisotropy, various liquid crystal materials are applicable. In a liquid crystal display device for which a high responsivity, rather than suppression in power consumption, is required, a liquid crystal having a large dielectric constant anisotropy may be used. The thickness of the liquid crystal layer 7 is not particularly limited. In the embodiment, Δnd of the liquid crystal layer 7, which is effectively applicable, is, for example, in a range of about 300 nm to 500 nm. In a case where formation of a pretilt angle to the alignment sustaining layer 251, 252 is performed by also using, for example, exposure by ultraviolet, the horizontal alignment requires a large exposure amount, and conversely, the vertical alignment requires a small exposure amount. Thus, from the standpoint of the alignment treatment, a liquid crystal with vertical alignment is preferable.

Figure 8:
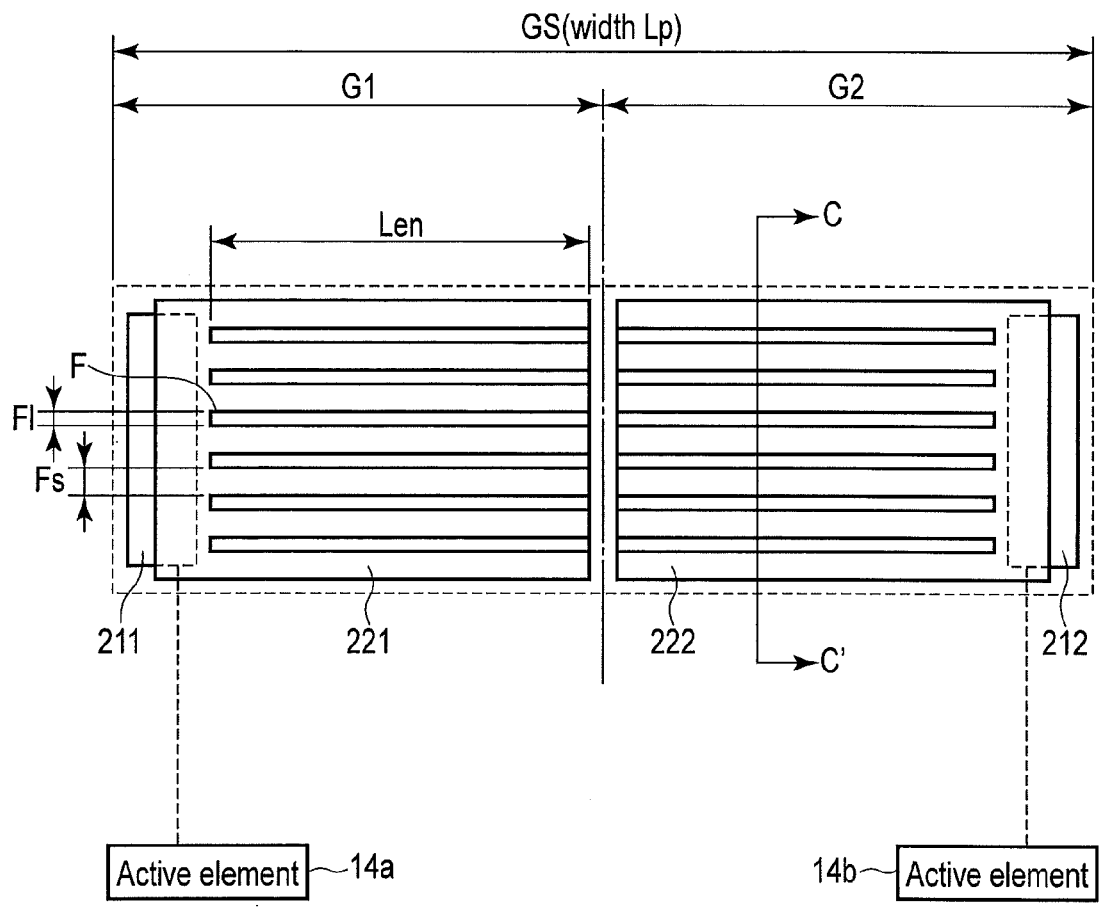
FIG. 8 is a plan view illustrating an example of a shape of pixel electrodes of two neighboring pixels of the liquid crystal display device according to the first embodiment.

FIG. 8 is a plan view illustrating an example of a shape of pixel electrodes of two neighboring pixels of the liquid crystal display device according to the first embodiment.

A plurality of flaw lines F are formed on that surface of the pixel electrode 221, 222, which is located on the liquid crystal layer 7 side. The longitudinal direction of the flaw lines F is parallel to the long sides of the pixel. The length of the flaw line F in the longitudinal direction is Len.

By forming the flaw lines F on that surface of the pixel electrode 221, 222, which is located on the liquid crystal layer 7 side, display non-uniformity in the pixel G1, G2 can be reduced, liquid crystal molecules can be tilted quickly, and responsivity is enhanced.

The transverse direction of the flaw line F is the vertical direction. The width of the flaw line F in the vertical direction is FI.

The interval (space width) of plural flaw lines F in the vertical direction is Fs.

In the case where the width of the pixel electrode 221, 222 in the vertical direction exceeds 3 µm, or in the case where the pixel electrode 221, 222 is formed with a rough pitch and a large width so as to be adaptive to a large-sized liquid crystal display or pixels of 250 ppi (pixel per inch) or less, liquid crystal molecules can be made easier to tilt, by forming the flaw lines F on the surface of the pixel electrode 221, 222, and fluctuation can be imparted to the liquid crystal alignment.

For example, one or more flaw lines F, each having a width of 1 µm or less in the vertical direction, are formed on the surface of the pixel electrode 221, 222. For example, one or more flaw lines F, each having a width of 1 µm or less in the lateral direction, are formed on the surface of the pixel electrode 221, 222. Flaw lines F are formed on that surface of the pixel electrode 221, 222, which is located on the liquid crystal layer 7 side, and it should suffice if a texture depending on the flaw lines F occurs on that surface of the alignment sustaining layer 252 formed on the pixel electrode 221, 222, which is located on the liquid crystal layer 7 side.

For example, in the case where the pixel electrode 221, 222 is formed of a transparent, electrically conductive film, the flaw line F may be formed by performing slight etching in a line shape, with a depth of 20 nm to 40 nm and a width of 0.5 µm to 2 µm, on the surface of the pixel electrode 221, 222 having a thickness of 150 µm. For example, by forming the alignment sustaining layer 252 with a small thickness of about 50 nm on the pixel electrode 221, 222, the texture of the flaw line F is expressed on the surface of the alignment sustaining layer 252. The depth of the flaw line F, which is formed in the insulation layer 20c by slight etching may be in a range of between 50 nm and less than 1.0 µm. In a part in which the pixel electrode 221, 222 and the common electrode 211, 212 do not overlap, when viewed in plan, a space may be formed in a flaw-line shape (slit shape) with a depth substantially corresponding to the thickness of the pixel electrode 221, 222. A taper may be formed in the flaw line F, when viewed in cross section. The width of a bottom part of the flaw line F formed by etching or the like should preferably be 1 µm or less. The space width Fs between plural flaw lines F may be set at about 2 µm to 8 µm.

Figure 9:
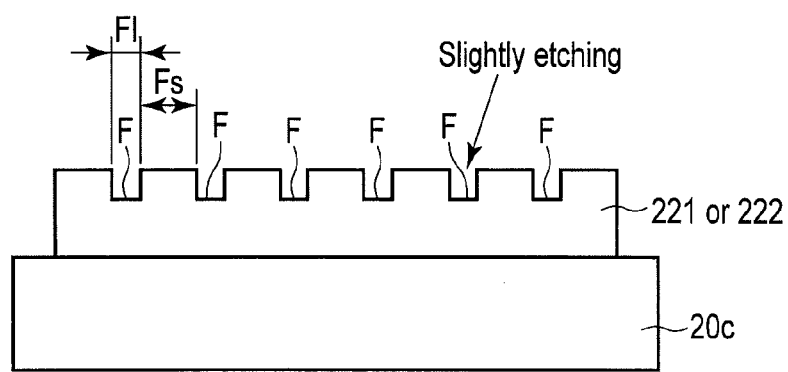
FIG. 9 is a cross-sectional view illustrating a first example of flaw lines formed on the pixel electrode.

FIG. 9 is a cross-sectional view illustrating a first example of a formation method of flaw lines F.

In FIG. 9, slight etching is performed on the pixel electrode 221, 222 which is formed by a transparent conductive film (ITO), and flaw lines F are formed on an upper surface of the pixel electrode 221, 222.

Figure 10:
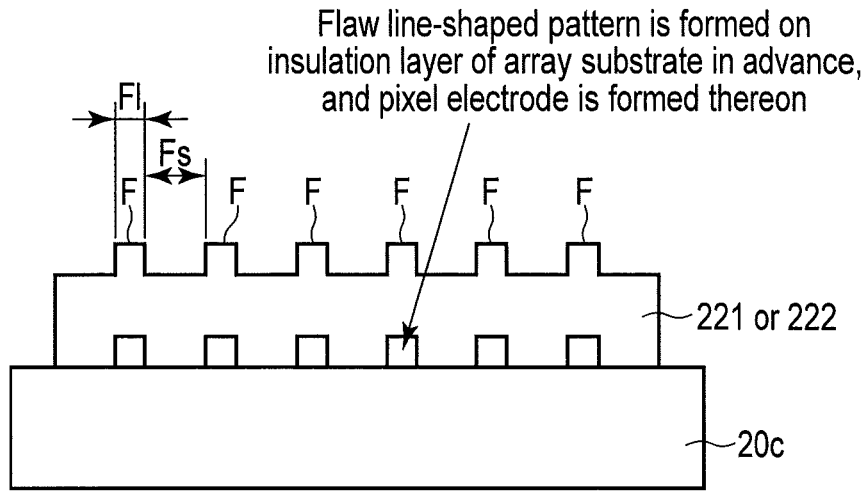
FIG. 10 is a cross-sectional view illustrating a second example of the flaw lines formed on the pixel electrode.

FIG. 10 is a cross-sectional view illustrating a second example of the formation method of flaw lines F.

In FIG. 10, a flaw line-shaped insulation pattern is formed in advance on the insulation layer 20c of the array substrate 6, and the pixel electrode 221, 222 is formed thereon. Thereby, flaw lines F are formed on an upper surface of the pixel electrode 221, 222.

Figure 11:
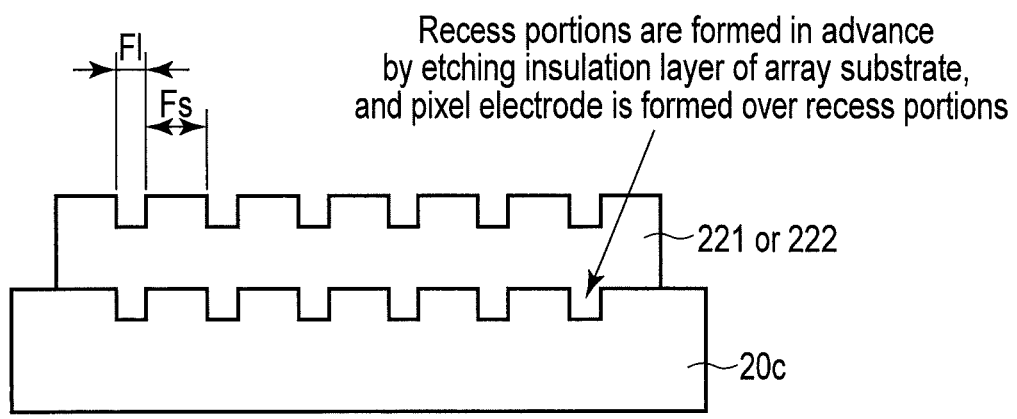
FIG. 11 is a cross-sectional view illustrating a third example of the flaw lines formed on the pixel electrode.

FIG. 11 is a cross-sectional view illustrating a third example of the formation method of flaw lines F.

In FIG. 11, the surface of the insulation layer 20c of the array substrate 6 is etched, and flaw line-shaped recess portions are formed. Thereafter, by stacking a transparent conductive film, a pixel electrode with flaw lines F is formed.

If an oblique electric field is formed between the pixel electrode 221, 222 and the counter-electrode 181, 182, a uniform "tilt" of liquid crystal molecules can be obtained on the pixel electrode 221, 222 by the flaw lines F formed on the pixel electrode 221, 222 in parallel to the pixel electrode 221, 222.

In the case of a pixel electrode 221, 222 with a large width, on which no flaw line F is formed, a "non-uniform tilt" of liquid crystal molecules occurs between a corner portion and a central portion of the pixel electrode 221, 222 as viewed in plan, and light/dark display or non-uniformity in transmittance tends to occur on the pixel electrode 221, 222 or within the pixel. Such light/dark display or non-uniformity causes a decrease in transmittance of the pixel. In addition, liquid crystal molecules disposed above the flaw lines F are, while being in vertical alignment, affected by the texture expressed by the flaw lines, and the liquid crystal molecules are easily titled by a low voltage, and high-speed driving becomes easier. The number of flaw lines F, which are formed, may be one or plural, in accordance with the width of the pixel electrode 221, 222. When the width of the pixel electrode 221, 222 is 3 µm or less and is small, the flaw line F may not be formed.

In the present embodiment, the counter-electrode 181, 182 is a transparent electrode, and may be formed in a stripe pattern. For example, in order to detect touching of a finger or the like, an electrostatic capacitance, which is formed between the counter-electrode 181, 182 with the stripe pattern and the common electrode 211, 212 of the array substrate 6, may be detected. Thereby, the liquid crystal display device 1 can be provided with a touch sensing function.

The alignment sustaining layer 251, 252 is formed, for example, by forming a photosensitive alignment film in advance, and radiating light, after the formation of a liquid crystal cell, while applying a voltage between at least two electrodes of the pixel electrode 221, 222, the common electrode 211, 212, and the counter-electrode 181, 182, thereby imparting a pretilt formation function to the photosensitive alignment film. The method, in which a photosensitive alignment film is formed and, after the formation of a liquid crystal cell, a voltage is applied and a pretilt is formed in an alignment film, is also called FPA or PSA. However, the pretilt formation function can be imparted more easily than in FPA or PSA, by forming in advance the above-described flaw lines F on the surface of the pixel electrode 221, 222 and using the alignment sustaining layer 251, 252 in which the pretilt is uniformly formed in the photosensitive alignment film.

The alignment sustaining layer 251 is formed directly or indirectly on the counter-electrode 181, 182 in the color filter substrate 5. The alignment sustaining layer 252 is formed directly or indirectly on the pixel electrode 221, 222 in the array substrate 6.

The alignment sustaining layer 251, 252 may be an organic film to which a pretilt angle is imparted by, e.g. light irradiation under an electric field. The alignment sustaining layer 251, 252 is formed at a position in contact with the liquid crystal layer 7. The alignment sustaining layer 251, 252 is formed by imparting a pretilt formation function for the liquid crystal to an alignment film which vertically aligns liquid crystal molecules, by radiation rays such as light or heat rays, or by radiation rays given under an electric field. As the radiation rays, ultraviolet may be used. The pretilt formation function by the alignment sustaining layer 251, 252, which is formed on a planar surface portion in a unit sub-pixel or a unit pixel, imparts a pretilt angle to the liquid crystal, practically, in a range of 0.1°~1.5°, and more preferably, in a range of 0.1°~1°. Since the liquid crystal display device 1 utilizes an oblique electric field, the liquid crystal molecules of the liquid crystal layer 7 can smoothly be driven even by a small pretilt angle of less than 1°. In a normally-black vertical-alignment liquid crystal, as the pretilt angle given by the alignment sustaining layer 251, 252 becomes smaller, light leakage at a time of black display can be more reduced and a higher contrast can be obtained. However, in usual cases, in a vertical-alignment liquid crystal with a small pretilt angle, a liquid crystal driving voltage on a low-voltage side increases, and reproducibility from black display to intermediate gradation display decreases.

If the alignment sustaining layer 251, 252 is used, even with a small pretilt angle, intermediate gradation display with a high liquid crystal responsivity can be performed at a low voltage. In addition, low power consumption can be realized by low-voltage driving. Incidentally, the pretilt angle refers to an inclination angle of the major axis of the liquid crystal molecule to the normal direction of the substrate plane at a time when no liquid crystal driving voltage is applied. When the pretilt angle of the vertical alignment liquid crystal becomes greater than 1.5°, there is a tendency that the contrast lowers due to light leakage. Accordingly, from the standpoint of the contrast, it is desirable that the pretilt angle be as small as possible. In the electrode configuration according to this embodiment, a higher liquid crystal responsivity and smoother intermediate gradation display can be achieved by the oblique electric fields produced between the pixel electrode 221, 222 and the protrusion portion 211a, 212a and between the pixel electrode 221, 222 and the counter-electrode 181, 182.

As the alignment film before alignment treatment for forming the alignment sustaining layer 221, 222 with the pretilt angle, use may be made of, for instance, photosensitive polyorganosiloxane, or a substance including a polymer between photosensitive polyorganosiloxane and polyamic acid or polyimide. In addition, as the alignment film, use may be made of a siloxane-based polymer represented by siloxane cinnamate. Besides, as the alignment film, use may be made of a coating film of, e.g. photosensitive polyimide or a photosensitive polymerizable liquid crystal material. Furthermore, as the alignment film, use may be made of a photo-alignment film using an azobenzene derivative, or a photo-alignment film including polyamic acid having a triple bond in the main chain. Incidentally, the pre-tilt angle is measured by, e.g. a crystal rotation method described in Journal of Applied Physics, Vol. 48, No. 5, pp. 1783-1792 (1977).

The structure and manufacturing method of the alignment sustaining layer 251, 252 will be described below.

The alignment sustaining layers (alignment films to which pretilt angles are given) 251, 252 are formed on those electrode surfaces of the color filter substrate 5 and array substrate 6, which are located on the side in contact with the liquid crystal layer 7.

In the color filter substrate 5 and array substrate 6, a vertical alignment agent is printed and vertical alignment films are formed. For example, as the vertical alignment agent, use is made of a mixture of photosensitive polyorganosiloxane and polyamic dissolved in advance in a mixture solvent of n-methyl-2-pyrrolidone and butyl cellosolve. The temperature for drying after the print is 180° C., and the thickness of each vertical alignment film is set at, e.g. about 60 nm.

An epoxy adhesive including spherical spacers of 3.6 µm is printed on the color filter substrate 5 as a liquid crystal sealing portion, a liquid crystal with a negative dielectric constant anisotropy is dispensed at a center of this color filter substrate 5, the array substrate 6 is attached so that no air may enter, and a liquid crystal cell is formed. This liquid crystal cell is once heated, and the liquid crystal is made isotropic.

Next, while an AC voltage is being applied to the pixel electrode 221, 222 of the array substrate 6, non-polarized ultraviolet of 1000 J/m$^2$ is radiated from a normal direction of a glass plane (a direction perpendicular to a glass plane) of the transparent substrate 19 on the side opposite to the liquid crystal layer 7. Incidentally, the counter-electrode 181, 182 and the common electrode 211 212 are set at a ground potential of 0 V.

By the magnitude of driving voltage, the manner of applying the voltage, the radiation amount of ultraviolet and the simultaneous use of polarized ultraviolet from an oblique direction, various pretilt angles can be given to the alignment films, and the alignment sustaining layers 251, 252 can be formed. In the present embodiment, the pretilt angle of the alignment sustaining layer 252 on the array substrate 6 is in the range of about 0.4°~0.9°, and liquid crystal molecules tilt in a direction in which the common electrode 211, 212 protrudes from the pixel electrode 221, 222 in the lateral direction.

Polarizers are attached to both surfaces of the liquid crystal cell which has been subjected to alignment treatment, and the liquid crystal display device 1 is formed. In the liquid crystal display device 1 according to the embodiment, there is little light leakage in the normally-black display at a time when no liquid crystal driving voltage is applied, and good black display can be realized.

In addition, in the liquid crystal display device 1 according to the embodiment, since the oblique electric field driving method by the pixel electrode 221, 222, common electrode 211, 212 and counter-electrode 181, 182 is applied, good intermediate gradation display can be performed on a low voltage side even if the pretilt angle of the liquid crystal layer 7, which is in contact with the alignment sustaining layer 251, 252, is small.

In the manufacture of the alignment sustaining layer 251, 252 of the liquid crystal display device 1 according to the embodiment, an AC voltage is applied to the pixel electrode 221, 222, the common electrode 211, 212 and counter-electrode 181, 182 are set at the ground potential of the common potential, and ultraviolet is radiated. Thereby, the pretilt formation function is given to the alignment sustaining layer 251, 252. The method of voltage application, the amount of light radiation and the wavelength of exposure can properly be adjusted in accordance with various dimensions of the liquid crystal display device 1, the material characteristics of the liquid crystal layer 7 and the alignment film that is used for the formation of the alignment sustaining layer 251, 252. For example, the AC voltage may be an asymmetric rectangular wave. In addition, as regards the application of the liquid crystal driving voltage, various adjustments are possible, such as setting any one of the pixel electrode 221, 222, common electrode 211, 212 and counter-electrode 181, 182 in the floating state, or shifting the common potential to a positive or negative side.

In the liquid crystal display device 1 of the above-described embodiment, display non-uniformity such as moiré can be eliminated, the display quality of a three-dimensional image can be enhanced, bright display can be performed, and easy switching can be made between three-dimensional display and two-dimensional display. These advantageous effects will be concretely described below.

In the present embodiment, laterally elongated pixels are formed. In this structure, a row of green pixels, a row of red pixels and a row of blue pixels are arranged in the lateral direction.

In ordinary vertically elongated pixels, three kinds of pixels, namely a red pixel, a green pixel and a blue pixel, are arranged in the lateral direction. In order to drive active elements located below the pixels, drivers for sending video signals in the vertical direction are necessary for the three colors.

By contrast, in the embodiment, since the laterally elongated pixels of the same color are arranged in the lateral direction and the three different colors are arranged in stripes in the vertical direction, the number of drivers of pixels can be reduced to ⅓ for the ordinary pixels, and the liquid crystal panel 2 can be manufactured at low cost. Since the power consumption of the drivers which handle video signals is high, the present embodiment can provide the liquid crystal display device 1 with low power consumption.

In addition, since the pixel width in the lateral direction of the pixels of each color in the liquid crystal display device 1 according to the embodiment is laterally large and is fixed, high-quality display with no color non-uniformity in units of a picture element can be realized, compared to the case of vertically elongated, inclined pixels. Furthermore, since thin-film transistors of an oxide semiconductor, which has low sensitivity in visible light range, can be used as the active elements 14a, 14b for driving the liquid crystal, the liquid crystal display device 1 with a fine black matrix BM and a large aperture ratio can be provided.

In this embodiment, display non-uniformity such as moiré, which is a problem in conventional three-dimensional display, can be eliminated, and, with bright display, switching between three-dimensional display and two-dimensional display can be realized by a simple configuration.

The liquid crystal display device 1 according to the embodiment is applicable to display devices which are disposed on a mobile phone, a game console, a tablet terminal, a notebook PC (personal computer), a television, a car dashboard, etc.

Incidentally, as a modification of the embodiment, the liquid crystal display device 1 may further include, in order to eliminate moiré, a plurality of triangular prisms having a longitudinal direction which is substantially perpendicular to the longitudinal direction of the plural triangular prisms.

In addition, for more effective three-dimensional image display, the longitudinal direction of the plural triangular prisms and the longitudinal direction of the plural semicylindrical lenses may be made substantially parallel, and the width of the triangular prism may be set at double the length of the pixel in the lateral direction.

The width of the semicylindrical lens may be set at an integer number of times of the width of two pixels in the lateral direction.

Another optical control element including an array of a plurality of semicylindrical lenses may be disposed between the array substrate 6 and the backlight unit 4, or on that surface side (observer side) of the color filter substrate 5, which is opposite to the liquid crystal layer 7 side. Furthermore, the longitudinal direction of the semicylindrical lenses included in this other optical control element may be set to be perpendicular to the lateral direction.

Second Embodiment

Figure 12:
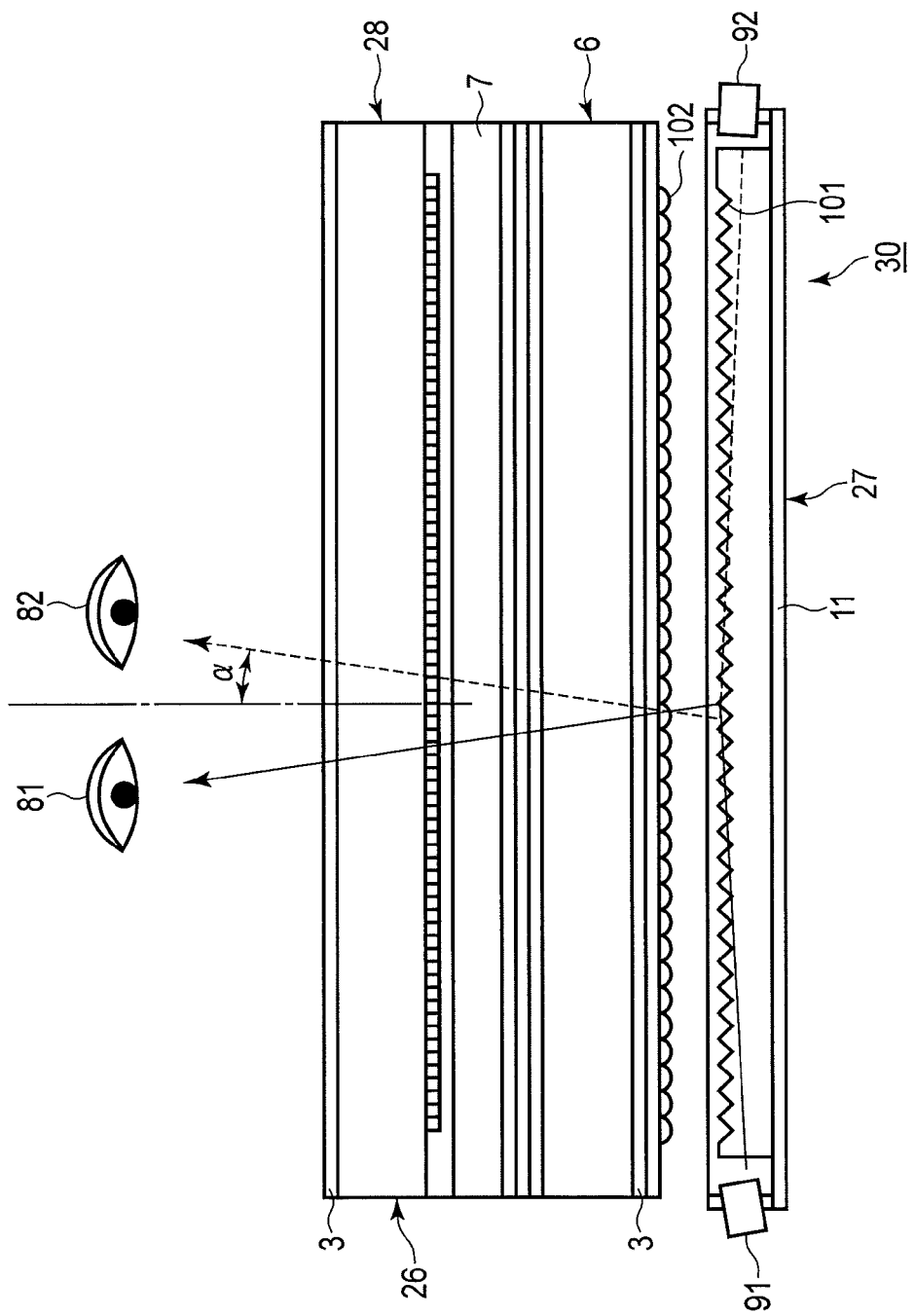
FIG. 12 is a cross-sectional view illustrating an example of a liquid crystal display device according to a second embodiment.

FIG. 12 is a cross-sectional view illustrating an example of a liquid crystal display device according to the present embodiment. FIG. 12 is a cross-sectional view in the lateral direction.

A liquid crystal display device 30 includes, as basic structural elements, a liquid crystal panel 26, polarizers 3, and a backlight unit 27. Incidentally, like the liquid crystal display device 1 according to the above-described first embodiment, the liquid crystal display device 30 may include a controller 12 and a light reception element 13.

Solid-state light emission elements 91, 92 are disposed at both ends of the backlight unit 27. The polarizer 3 may be formed by attaching a retardation plate.

The liquid crystal panel 26 is configured such that a color filter substrate 28 and an array substrate 6 are opposed to each other, and a liquid crystal layer 7 is provided between the color filter substrate 28 and the array substrate 6. In the liquid crystal panel 26, a plurality of pixels each having a laterally elongated shape, which include red pixels, green pixels and blue pixels, are arranged in the lateral direction. In this embodiment, the pixels are arranged in the lateral direction such that the pixels of the same color neighbor. The polarizer 3 and a retardation plate (not shown) are provided on a front surface and/or a back surface of the liquid crystal panel 2.

The main structure of the liquid crystal display device 30 according to this embodiment is substantially the same as that of the above-described first embodiment.

The liquid crystal display device 30 according to the embodiment has two change points from the liquid crystal display device 1 according to the first embodiment.

The first change point is that both the array of triangular prisms, which is the optical control element 101, and the array of cylindrical lenses, which is the optical control element 102, are perpendicular to the lateral direction and the normal direction of the liquid crystal panel 26 (i.e. perpendicular to the cross section of FIG. 12). In addition, both the triangular prism and the cylindrical lens have the same width as a width Lp of two pixels.

The second change point is that pixels arranged in the lateral direction are parallelogrammatic with a long side having an angle γ to the lateral direction, and a short side parallel to the vertical direction. The angle γ is set in a range of, e.g. about 5° to 30°, and is set at, for instance, about 15°. By forming each pixel arranged in the lateral direction in the parallelogrammatic shape with the angle γ, moiré can be reduced.

Figure 13:
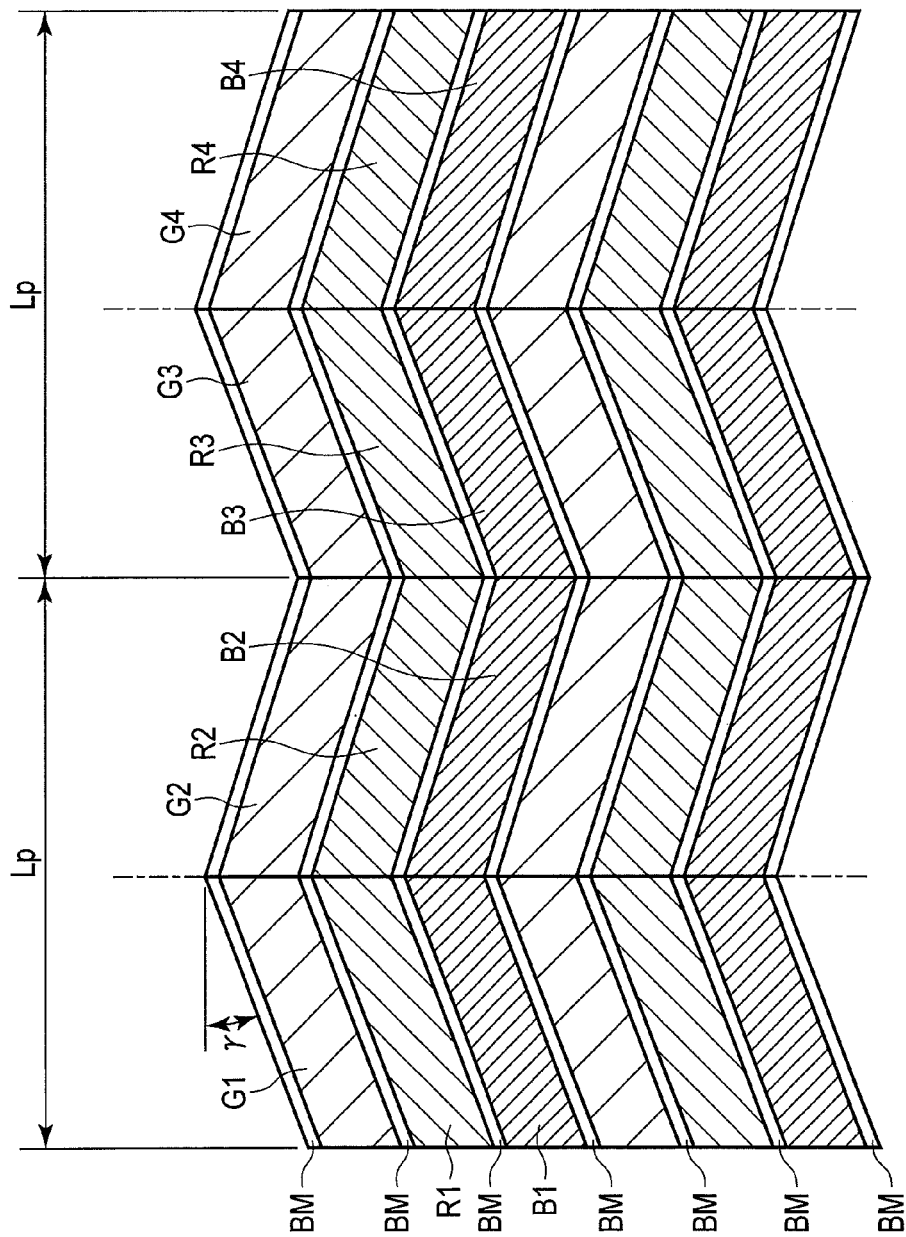
FIG. 13 is a plan view illustrating an example of a color filter substrate of the liquid crystal display device according to the second embodiment.

FIG. 13 is a plan view illustrating an example of the color filter substrate 28 of the liquid crystal display device 30 according to the present embodiment. FIG. 13 is a front view of the color filter substrate 28, and illustrates a state in which the color filter substrate 28 is viewed from the observer.

In FIG. 13, pixels of the same color neighbor at short sides of the pixels in the vertical direction. The arrangement of pixels in the lateral direction has a repetitive pattern of two pixels of the same color in a V shape. The mutually neighboring pixels in the lateral direction are symmetric with respect to the center line. Incidentally, the arrangement of pixels in the lateral direction may have a repetitive pattern of two pixels of the same color in an inverted-V shape.

Since the pixel has the angle γ for reducing moiré and the pixels of the same color are arranged in the lateral direction, three-dimensional image display with less moiré and color non-uniformity can be realized. By not forming the black matrix BM between the laterally neighboring pixels, bright three-dimensional image display with less color moiré can be realized.

For example, a first picture element is composed of green pixels G1 and G2, red pixels R1 and R2 and blue pixels B1 and B2, and a second picture element is composed of green pixels G3 and G4, red pixels R3 and R4 and blue pixels B3 and B4.

FIG. 14 is a plan view illustrating an example of a shape of pixel electrodes 221, 222 of two neighboring pixels G1, G2 of the liquid crystal display device 30 according to the present embodiment.

In addition, FIG. 15 is a plan view illustrating an example of the shape of the pixel electrodes 221, 222 of plural pixels G1 to G4, R1 to R4, and B1 to B4 and tilt directions of liquid crystal molecules in the liquid crystal display device 30 according to this embodiment.

In FIG. 14 and FIG. 15, parallelogrammatic pixels having the angle γ to the lateral direction, when viewed in plan, are arranged. FIG. 14 illustrates plan-view shapes of the pixels G1, G2, and FIG. 15 illustrates plan-view shapes of the green pixels G1 to G4, red pixels R1 to R4, and blue pixels B1 to B4.

Each of the pixels G1 to G4, R1 to R4 and B1 to B4 is equipped with an active element 14a or an active element 14b.

The active element 14a, 14b is, for example, a thin-film transistor of an oxide semiconductor having a transparent channel layer of two or more kinds of metal oxides. If a liquid crystal driving voltage is applied to the pixel electrode 221 or pixel electrode 222 of the pixels G1 to G4, R1 to R4 and B1 to B4 via the active element 14a, 14b, the liquid crystal on the pixel electrode 221 or pixel electrode 222 tilts in a direction of an arrow 311, 312. The arrow 311, 312 has an angle γ to the lateral direction. The arrows 311, 312 are line-symmetric with respect to the center axis of the neighboring pixels. Flaw lines F are formed on the surface of the pixel electrode 221 or pixel electrode 222. By the flaw lines F, high liquid crystal responsivity and uniformity in display in the pixel can be realized. The flaw lines F can be formed similarly with the first embodiment.

FIG. 16 is a cross-sectional view illustrating an example of synchronization between the pixel electrode 221 of one of two neighboring pixels and the solid-state light emission element 91.

Figure 17:
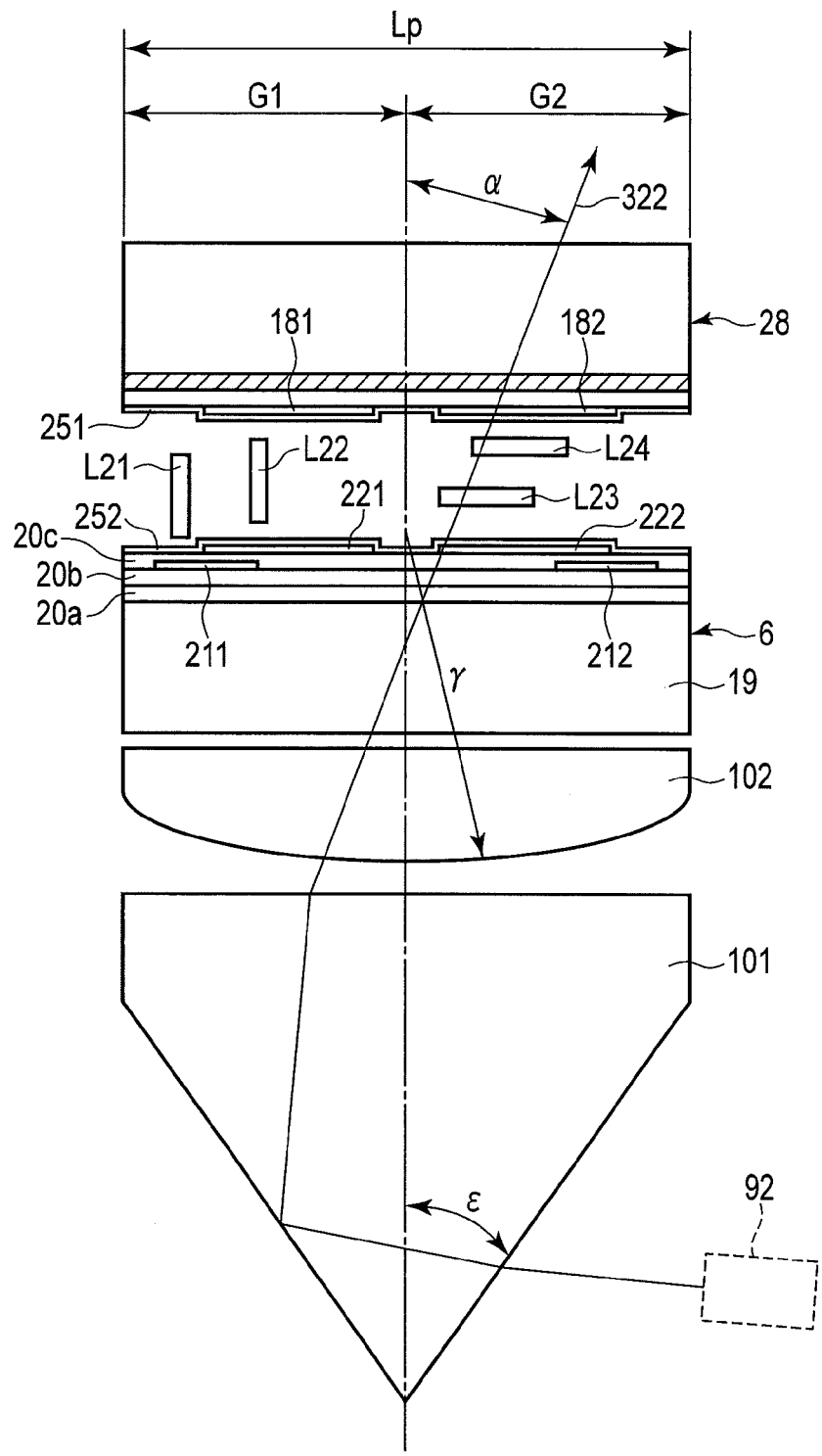
FIG. 17 is a cross-sectional view illustrating an example of synchronization between a pixel electrode of the other of the two neighboring pixels and a solid-state light emission element.

FIG. 17 is a cross-sectional view illustrating an example of synchronization between the pixel electrode 222 of the other of two neighboring pixels and the solid-state light emission element 92.

FIG. 16 and FIG. 17 illustrate cross sections of the two pixels G1 and G2, and represent the operations for three-dimensional image display of the optical control elements 101, 102.

By applying the liquid crystal driving voltage to the pixel electrode 221 in FIG. 16, liquid crystal molecules L21, L22 of the left-side pixel G1 in FIG. 16 tilt. In synchronism with the application of the voltage to the pixel electrode 221, the solid-state light emission element 91 is caused to emit light. As illustrated in FIG. 16, the light emitted from the solid-state light emission element 91 passes through the triangular prism of the optical control element 101 and the cylindrical lens of the optical control element 102, and is emitted toward the right eye 81 of the observer as emission light 321. An emission angle α can be set, mainly based on a distal-end angle ∈ of the triangular prism and a curvature r of the cylindrical lens. For example, by adjusting the magnitude of the distal-end angle of the triangular prism, the emission light of the left-side solid-state light emission element 91 can be emitted to the opposite left eye 82.

Similarly, by applying the liquid crystal driving voltage to the pixel electrode 222 in FIG. 17, liquid crystal molecules L23, L24 of the right-side pixel G2 in FIG. 17 tilt. In synchronism with the application of the voltage to the pixel electrode 222, the solid-state light emission element 92 is caused to emit light. As illustrated in FIG. 17, the light emitted from the solid-state light emission element 92 passes through the triangular prism of the optical control element 101 and the cylindrical lens of the optical control element 102, and is emitted toward the left eye 82 of the observer as emission light 322.

As has been described above, by providing the angle γ to the lateral direction with respect to the plan-view shape of the pixel G1, G2, the moiré in three-dimensional image display can greatly be reduced. Furthermore, by not providing the black matrix BM in the vertical direction, the moiré due to an alignment error between the pixel and the optical control element 101, 102 can be reduced. In the case where priority is to be placed on the contrast at a time of liquid crystal display, the black matrix BM for partitioning the pixels in the vertical direction may be provided.

For example, an electrically conductive metal oxide thin film of, e.g. ITO or IZO can be used as the material of the pixel electrode 221, 222 and the common electrode 211, 212 of the array substrate 6 of the liquid crystal display device 30 according to the embodiment.

The pixel electrode 221, 222 and the common electrode 211, 212 are electrically insulated by an insulation film 20c in the thickness direction thereof. The thicknesses of the color filter 16, transparent resin layer 17 and insulation layers 20a to 20c can be adjusted based on the thickness of the liquid crystal layer 7, dielectric constant, application voltage and driving condition.

In the case where the insulation layers 20a to 20c are formed of SiNx (silicon nitride), the practical range of film thickness of the insulation layers 20a to 20c is, for example, 0.1 μm to 1.0 μm. In the liquid crystal display device 30 according to the present embodiment, since an oblique electric field can more effectively be utilized, the range, in which electric force lines act at a time of driving voltage application, may be increased in the direction of film thickness including the liquid crystal layer 7, transparent resin layer 17 and color filter 16. Thereby, the transmittance of light can be increased. In order to increase the transmittance in this manner, the counter-electrodes 181, 182 may be provided between the transparent substrate 17 and color filter 16. For example, Jpn. Pat. Appln. KOKAI Publication No. 2009-105424 discloses a technique of forming signal lines, such as gate lines and source lines, by a single layer of an aluminum alloy having a low contact property with ITO that is an electrically conductive metal oxide. To further stack an insulation layer on the pixel electrode 221, 222 is preferable since this has an effect of reducing an image persistence of the liquid crystal (the effect of non-uniformity or accumulation of electric charge) at the time of driving the liquid crystal.

The signal lines may be, for example, aluminum lines or copper lines. In a case where the signal line includes copper, for example, the signal line may be formed by a multilayer structure in which copper and titanium are stacked, or a multilayer structure in which copper, titanium and silicon are stacked. The titanium included in the signal line may be replaced with, for example, molybdenum, tungsten, or other high-melting-point metal.

In the case where the active element 91, 92 is a thin-film transistor of an oxide semiconductor with a channel layer which is transparent in a visible range, the line width of the pattern of the light-shield layer, such as the black matrix BM, can be reduced, and the brightness of the liquid crystal display device 30 can be enhanced. In the case where the thin-film transistor of the oxide semiconductor is used in the liquid crystal display device 30, optical alignment can efficiently be performed and the reliability of the liquid crystal display device 30 can be enhanced. In a conventional PSA technique using a liquid crystal to which a photopolymerizable monomer is added, there is a case in which the reliability of the liquid crystal display device is degraded by a residual non-polymerized monomer or an insufficiently cured optical alignment film due to ultraviolet shielding by the light-shield portion of the thin-film transistor that occupies a large area relating to the silicon semiconductor or the black matrix BM which partitions colored pixels, or the color filter with poor ultraviolet transmittance. However, as in the embodiment, by using the thin-film transistor of the oxide semiconductor, it is possible to decrease the area of the light-shield portion, to perform exposure on a wide area, and to greatly enhance the reliability. Compared to this thin-film transistor of the oxide semiconductor, a thin-film transistor of a silicon semiconductor has sensitivity to light in a visible range, and it is thus necessary to light-shield the thin-film transistor with a larger area by a light-shield layer such as a black matrix BM.

As the oxide semiconductor, composite metal oxides which are transparent in the visible range are applicable. A semiconductor material including these metal oxides as components is an oxide including two or more elements of zinc, indium, tin, tungsten, magnesium, and gallium. As materials, for instance, use may be made of zinc oxide, indium oxide, indium-zinc-oxide, tin oxide, tungsten oxide (WO), indium-gallium-zinc-oxide (In—Ga—Zn—O), indium-gallium-oxide (In—Ga—O), zinc-tin-oxide (Zn—Sn—O), or zinc-tin-silicon-oxide (Zn—Sn—Si—O), or other materials. These materials are substantially transparent, and the band gap should preferably be 2.8 eV or more, and should more preferably be 3.2 eV or more. The structure of these materials may be any one of a single crystal, a polycrystal, a microcrystal, a mixed crystal of a crystalline/amorphous structure, a nanocrystal-dispersed amorphous structure, and an amorphous structure. It is desirable that the film thickness of an oxide semiconductor layer be 10 nm or more. The oxide semiconductor layer is formed by using a method such as a sputtering method, a pulse laser deposition method, a vacuum evaporation method, a CVD (Chemical Vapor Deposition) method, an MBE (Molecular Beam Epitaxy) method, an ink jet method, or a print method. Preferably, the oxide semiconductor layer is formed by the sputtering method, pulse laser deposition method, vacuum evaporation method, ink jet method, or print method. As regards the sputtering method, an RF magnetron sputtering method or a DC sputtering method is usable, but, more preferably, the DC sputtering method is used. As a starting material (target material) for sputtering, an oxide ceramic material or a metallic target material can be used. As regards the vacuum evaporation, heating evaporation, electron beam evaporation, and an ion plating method can be used. As the print method, transfer printing, flexography, gravure printing, and gravure offset printing are usable, but other methods may be used. As the CVD method, a hotwire CVD method and plasma CVD are usable. Furthermore, other methods may be used, such as a method in which a hydrate of an inorganic salt (e.g. chloride) is dissolved in alcohol, etc., and baked and sintered, thereby forming an oxide semiconductor.

Next, a description is given of the structures of the thin-film transistor of the oxide semiconductor and the array substrate 6. As illustrated in FIG. 16, in the array substrate 6, insulation layers 20a, 20b, common electrodes 211, 212, an insulation layer 20c, pixel electrodes 221, 222, and an alignment sustaining layer 252 are formed in the named order on a transparent substrate (e.g. glass substrate) 19. The array substrate 6 includes active elements 14a, 14b for applying a liquid crystal driving voltage to the pixel electrodes 221, 222, and gate lines and source lines which are electrically connected to the active elements 14a 14b.

The active element 14a, 14b has, for example, a bottom-gate-type top contact etch stopper structure.

Alternatively, the active element 14a, 14b may have, for example, a bottom-gate-type top contact structure excluding an etch stopper, or a back channel structure. The transistor structure is not limited to the bottom gate structure, and may be a top gate structure, a double gate structure, or a dual gate structure.

In the manufacture of the active element 14a, 14b, to begin with, an ITO thin film of 140 nm is formed by a DC magnetron sputtering method. Then, the ITO thin film is patterned in a desired shape, and a gate electrode and an auxiliary capacitor electrode are formed. Further, a $SiH_x$ thin film of 350 nm is formed thereon by using a plasma CVD method, with use of $SiH_4$, $NH_3$ and $H_2$ as a material gas, and thus a gate insulation film that is a transparent insulation film is formed. In addition, as a channel layer, an amorphous In—Ga—Zn—O thin film of 40 nm is formed by a DC sputtering method by using an $InGaZnO_4$ target, and the amorphous In—Ga—Zn—O thin film is pattered in a desired shape, and thus a transparent channel layer is formed. Further, an SiON thin film is formed by an RF sputtering method by using a $Si_3H_4$ target while introducing Ar and $O_2$, and the SiON thin film is patterned in a desired shape, and thus a channel protection layer is formed. Furthermore, an ITO thin film of 140 nm is formed by a DC magnetron sputtering method and is patterned in a desired shape, and a source/drain electrode is formed.

In the liquid crystal display device 30 according to the above-described embodiment, the same advantageous effects as with the liquid crystal display device 1 according to the above-described first embodiment can be obtained.

Third Embodiment

In the present embodiment, transparent resins and organic pigments, which are used for the color filter substrates 5, 28 according to the above-described first and second embodiments, will be exemplarily described.

(Transparent Resins)

A photosensitive color composition, which is used for forming the black matrix BM and color filter 16, includes, in addition to a pigment-dispersed body, a multifunctional monomer, a photosensitive resin or a nonphotosensitive resin, a polymerization initiator, and a solvent. Organic resins with high transparency which can be used in the present embodiment, for instance, a photosensitive resin or a nonphotosensitive resin, are generally referred to as transparent resins.

As the transparent resins, use can be made of thermoplastic resins, thermosetting resins, or photosensitive resins. As the thermoplastic resins, for example, use can be made of a butyral resin, styrene-maleic acid copolymer, chlorinated polyethylene, chlorinated polypropylene, polyvinyl chloride, vinyl chloride-vinyl acetate copolymer, polyvinyl acetate, polyurethane resin, polyester resin, acrylic resin, alkyd resin, polystyrene resin, polyamide resin, rubber resin, cyclized rubber resin, celluloses, polybutadiene, polyethylene, polypropylene, and polyimide. In addition, as the thermosetting resins, for example, use can be made of an epoxy resin, benzoguanamine resin, rosin-modified maleic acid resin, rosin-modified fumaric acid resin, melamine resin, urea resin, and phenol resin. The thermosetting resin may be produced by a reaction between a melamine resin and a compound including an isocyanate group.

(Alkali-Soluble Resins)

For the formation of the light-shield pattern such as the black matrix BM, the transparent pattern and the color filter, which are used in the present embodiment, it is preferable to use photosensitive resin compositions which are capable of patterning by photolithography. It is desirable that these transparent resins be resins to which alkali-solubility is imparted. As the alkali-soluble resins, resins including a carboxyl group or a hydroxyl group may be used, or other resins may be used. As the alkali-soluble resins, for example, use can be made of an epoxy acrylate resin, novolak resin, polyvinylphenol resin, acrylic resin, carboxyl group-containing epoxy resin, and carboxyl group-containing urethane resin. Of these, the epoxy acrylate resin, novolak resin and acrylic resin should preferably be used as the alkali-soluble resins, and, in particular, the epoxy acrylate resin and novolak resin are preferable.

(Acrylic Resins)

As typical transparent resins which are applicable in the embodiment, the following acrylic resins are exemplarily described.

As the acrylic resins, use can be made of polymers which are obtained by using, as monomers, for instance, (meth) acrylic acid; alkyl(meth)acrylate such as methyl(meth)acrylate, ethyl(meth)acrylate, propyl(meth)acrylate, butyl(meth)acrylate, t-buthyl(meth)acrylate, benzyl(meth)acrylate, or lauryl(meth)acrylate; hydroxyl group-containing (meth) acrylate such as hydroxyethyl(meth)acrylate or hydroxypropyl(meth)acrylate; ether group-containing (meth)acrylate such as ethoxyethyl(meth)acrylate or glycidyl(meth)acrylate; and alicyclic(meth)acrylate such as cyclohexyl(meth) acrylate, isobornyl(meth)acrylate, or dicyclopentenyl(meth) acrylate.

Incidentally, the monomers described above by way of example can be used singly or in combination of two or more kinds. Further, the acrylic resin may be produced by using a copolymer by a compound, such as styrene, cyclohexyl maleimide, or phenyl maleimide, which is copolymerizable with these monomers.

In addition, for example, a resin with photosensitivity may be produced by a reaction between a copolymer obtained by copolymerizing carboxylic acid having an ethylenic unsaturated group such as (meth)acrylic acid, and a compound including an epoxy group and an unsaturated double bond, such as glycidyl methacrylate. For example, a resin with photosensitivity may be produced by adding a carboxylic acid-containing compound, such as (meth)acrylic acid, to a polymer of epoxy group-containing (meth)acrylate, such as glycidyl methacrylate, or a copolymer between this polymer and other (meth)acrylate.

(Organic Pigments)

As red pigments, for example, use can be made of C. I. Pigment Red 7, 9, 14, 41, 48:1, 48:2, 48:3, 48:4, 81:1, 81:2, 81:3, 97, 122, 123, 146, 149, 168, 177, 178, 179, 180, 184, 185, 187, 192, 200, 202, 208, 210, 215, 216, 217, 220, 223, 224, 226, 227, 228, 240, 242, 246, 254, 255, 264, 272, and 279.

As yellow pigments, for example, use can be made of C. I. Pigment Yellow 1, 2, 3, 4, 5, 6, 10, 12, 13, 14, 15, 16, 17, 18, 20, 24, 31, 32, 34, 35, 35:1, 36, 36:1, 37, 37:1, 40, 42, 43, 53, 55, 60, 61, 62, 63, 65, 73, 74, 77, 81, 83, 86, 93, 94, 95, 97, 98, 100, 101, 104, 106, 108, 109, 110, 113, 114, 115, 116, 117, 118, 119, 120, 123, 125, 126, 127, 128, 129, 137, 138, 139, 144, 146, 147, 148, 150, 151, 152, 153, 154, 155, 156, 161, 162, 164, 166, 167, 168, 169, 170, 171, 172, 173, 174, 175, 176, 177, 179, 180, 181, 182, 185, 187, 188, 193, 194, 199, 213, and 214.

As blue pigments, for example, use can be made of C. I. Pigment Blue 15, 15:1, 15:2, 15:3, 15:4, 15:6, 16, 22, 60, 64, and 80. Of these, C. I. Pigment Blue 15:6 is preferable.

As violet pigments, for example, use can be made of C. I. Pigment Violet 1, 19, 23, 27, 29, 30, 32, 37, 40, 42, and 50. Of these, C. I. Pigment Violet 23 is preferable.

As green pigments, for example, use can be made of C. I. Pigment Green 1, 2, 4, 7, 8, 10, 13, 14, 15, 17, 18, 19, 26, 36, 45, 48, 50, 51, 54, 55, and 58. Of these, C. I. Pigment Green 58, which is a halogenated zinc phthalocyanine green pigment, is preferable.

(Color Materials of Black Matrix BM)

A light-shielding color material included in the layer of the black matrix BM is a color material which exhibits a light-shield function by having absorption in a visible light wavelength range. In the embodiment, as the light-shielding color materials, for example, organic pigments, inorganic pigments, and dyes are usable. As the inorganic pigments, for example, carbon black and titanium oxide can be used. As the dyes, for example, an azoic dye, anthraquinone dye, phthalocyanine dye, quinonimine dye, quinoline dye, nitro dye, carbonyl dye, and methine dye are usable. As regards the organic pigments, the above-described organic pigments can be adopted. Incidentally, a light-shielding component may be one kind, or a combination of two or more kinds with a proper ratio. In addition, a volume resistance may be increased by resin coating on the surface of these color materials, or, conversely, the volume resistance may be decreased by imparting a slight electrical conductivity by increasing the content ratio of the color material to the base material of the resin. However, since the volume resistance value of such light-shield material is in a range of about $1 \times 10^8 \sim 1 \times 10^{15}$ $\Omega \cdot$cm, this is not such a level as to affect the resistance value of the transparent conductive film. Similarly, the specific dielectric constant of the light-shield layer can be adjusted in a range of about 3 to 30 by the selection or content ratio of the color material. The specific dielectric constants of the coating film of the black matrix BM, the coating film of the color pixel and the transparent resin layer can be adjusted within the above-described range of the specific dielectric constant, in accordance with the design conditions and liquid crystal driving conditions of the liquid crystal display device 1, 30.

In the present embodiment, there is no need to form a large light-shield part in a case of using a silicon-based thin-film transistor, such as an amorphous silicon-based thin-film transistor. It is possible to eliminate moiré due to non-uniformity of a black matrix pattern within a pixel at a time of using a silicon-based thin-film transistor, and due to an alignment defect relative to the optical control element 101, 102.

The above-described embodiments may be variously altered and applied without departing from the spirit of the invention. The above embodiments may be freely combined and used.

What is claimed is:

1. A liquid crystal display device comprising:
an array substrate including a plurality of pixel electrodes corresponding to a plurality of pixels arranged in a matrix;
a color filter substrate opposed to the array substrate and including color filters corresponding to the plurality of pixels and a black matrix which partitions the pixels;
a liquid crystal layer provided between the array substrate and the color filter substrate and having a negative dielectric constant anisotropy;
a pair of polarizers provided on a back surface side of the array substrate and a front surface side of the color filter substrate, the back surface of the array substrate being opposed to the liquid crystal layer side of the array substrate and the front surface side of the color filter substrate being opposed to the liquid crystal layer side of the color filter substrate;
a backlight unit provided on the back surface side of the array substrate via one of the pair of polarizers;
a controller configured to control an application timing of a liquid crystal driving voltage to the pixel electrodes, and a light emission timing of the backlight unit;
an optical control element disposed in a manner to oppose to the one of the pair of polarizers and including an array of a plurality of triangular prisms and an array of a plurality of semicylindrical lenses; and
a light reception element configured to detect light which is incident from an observer side,
wherein the backlight unit is an edge-lit-type unit including a solid-state light-emission element array,
the plurality of pixels include a picture element composed of two red pixels, two green pixels and two blue pixels,
the plurality of pixels include flaw-lines parallel to the long side of the pixel, and have shapes of the line-symmetry with respect to the center line of the neighboring pixels,
the plurality of pixels are configured to each have a shape which is elongated in a lateral direction, and configured such that identical colors are arranged in the lateral direction, and different colors are arranged in a vertical direction,
pixels neighboring in the lateral direction of the plurality of pixels have shapes of line-symmetry with respect to a center line of the neighboring pixels,
the controller is configured to execute, based on a video signal, synchronization control between the application timing of the liquid crystal driving voltage to the pixel electrodes, and the light emission timing of the backlight unit,
the controller is configured to detect a position of the observer based on data measured by the light reception element and to adjust an emission angle of light emitted by the backlight unit, based on the detected position of the observer,
an angle is provided between a longitudinal axis of the cylindrical lens and a longitudinal axis of the triangular prism, the angle being set in a range of 3 degree to 42 degree and being set at such an angle as not to interfere with the optical axis of the polarizers or liquid crystal alignment, and
liquid crystal molecules of the neighboring pixels tilt in directions of the line-symmetry with respect to the center line when the liquid crystal driving voltage is applied to the pixel electrodes corresponding to the neighboring pixels.

2. The liquid crystal display device of claim 1, wherein the black matrix is formed between pixels neighboring in the vertical direction and is not formed between pixels neighboring in the lateral direction.

3. The liquid crystal display device of claim 1, further comprising a plurality of active elements which are electrically connected to the plurality of pixel electrodes and are formed of an oxide semiconductor using a composite metal oxide as a transparent channel material.

4. The liquid crystal display device of claim 1, wherein the plurality of pixels are parallelogrammatic with a long side having an angle .gamma. to the lateral direction, and a short side parallel to the vertical direction.

5. The liquid crystal display device of claim 4, wherein two pixels neighboring in the lateral direction are of the same color and have a V shape or an inverted-V shape, and
a pattern of the V shape or the inverted-V shape is repeated in the lateral direction.

6. The liquid crystal display device of claim 1, wherein the plurality of pixels are rectangular with a long side in the lateral direction, and a short side in the vertical direction.

7. The liquid crystal display device of claim 1, wherein the plurality of pixels include flaw lines parallel to the long side of the pixel, and have shapes of the line-symmetry with respect to the center line of the neighboring pixels.

8. The liquid crystal display device of claim 1, wherein the array substrate includes a plurality of common electrodes, an insulation layer and the pixel electrodes on a transparent substrate,
in a plan view of the liquid crystal display device, the common electrode partly overlaps the pixel electrode in the same pixel, and
the common electrodes included in the pixels neighboring in the lateral direction are line-symmetric with respect to the center line of the pixels neighboring in the lateral direction.

9. The liquid crystal display device of claim 1, wherein a width of the triangular prism is double a length of the pixel in the lateral direction.

10. The liquid crystal display device of claim 9, wherein a width of the semicylindrical lens is an integer number of times of a width of two pixels in the lateral direction.

11. The liquid crystal display device of claim 1, wherein a longitudinal direction of the plurality of semicylindrical lenses is perpendicular to the lateral direction.

12. The liquid crystal display device of claim 1, wherein the liquid crystal layer includes liquid crystal molecules of vertical alignment.

* * * * *

UNITED STATES PATENT AND TRADEMARK OFFICE
CERTIFICATE OF CORRECTION

PATENT NO.      : 9,508,293 B2
APPLICATION NO. : 14/517005
DATED           : November 29, 2016
INVENTOR(S)     : Yasuhiro Shima et al.

Page 1 of 1

It is certified that error appears in the above-identified patent and that said Letters Patent is hereby corrected as shown below:

In the Claims

Column 26, Line 22, Claim 4:
Delete ".gamma." and insert --γ--, therefor.

Signed and Sealed this
Twenty-eighth Day of February, 2017

Michelle K. Lee
*Director of the United States Patent and Trademark Office*